(12) United States Patent
Tenny

(10) Patent No.: US 8,126,499 B2
(45) Date of Patent: Feb. 28, 2012

(54) PROCESSING QOFFSET PARAMETER

(75) Inventor: Nathan Edward Tenny, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 902 days.

(21) Appl. No.: 12/164,499

(22) Filed: Jun. 30, 2008

(65) Prior Publication Data

US 2009/0011757 A1  Jan. 8, 2009

Related U.S. Application Data

(60) Provisional application No. 60/948,421, filed on Jul. 6, 2007.

(51) Int. Cl.
H04B 7/00 (2006.01)

(52) U.S. Cl. .................. 455/525; 455/115.1; 455/513; 455/67.11; 455/115.4

(58) Field of Classification Search .............. 455/403, 455/436, 443, 425, 446, 456.1, 575.8, 437, 455/438, 439, 440, 442, 444, 513, 115.4, 455/435.2, 451.1, 456.2, 67.11, 67.16, 67.13, 455/115.1, 115.3; 370/331, 332, 315, 328
See application file for complete search history.

(56) References Cited

U.S. PATENT DOCUMENTS

| 5,640,677 | A | 6/1997 | Karlsson | |
|---|---|---|---|---|
| 6,466,790 | B2 * | 10/2002 | Haumont et al. | 455/437 |
| 2004/0023634 | A1 * | 2/2004 | Jeong et al. | 455/403 |
| 2008/0267114 | A1 * | 10/2008 | Mukherjee et al. | 370/315 |

FOREIGN PATENT DOCUMENTS

RU 2113772 C1 6/1998

OTHER PUBLICATIONS

"Universal Mobile Telecommunications System (UMTS); User Equipment (UE) procedures in idle mode and procedures for cell reselection in connected mode (3GPP TS 25.304 version 7.2.0 Release 7); ETSI TS 125.304" ETSI Standards, Lis, Sophia Antipolis Cedex, France, vol. 3-R2, No. V7.2.0, Jun. 1, 2007, XP014037899, ISSN: 0000-0001.

(Continued)

*Primary Examiner* — Tan Trinh
(74) *Attorney, Agent, or Firm* — Milan Patel; Kam T. Tam

(57) ABSTRACT

Systems, methodologies, and devices are described that employ indicators related to a parameter value(s) associated with a neighbor cell to facilitate communication by a mobile device in a network. The mobile device optionally can read a parameter value associated with a detected neighbor cell, and can provide, to the serving base station, signal strength information and indicator information that indicates whether, the mobile device read the parameter value. The serving base station can select a cell to which the mobile device is to be communicatively connected based in part on evaluating the received information. If a parameter value is not read by the mobile device, the serving base station can request the parameter value from a neighbor cell. The neighbor cell can provide a one-to-one indicator to indicate when a specified parameter value is to be applied with regard to a particular base station.

23 Claims, 14 Drawing Sheets

OTHER PUBLICATIONS

RAN WG2: "LS on neighbour cell lists and reading neighbour cell P-BCH; R2-072188" 3GPP TSG RAN WG2#58, [Online] May 7, 2007, pp. 1-2. XP002504354, Retrieved from the internet URL:http://www.3gpp.org/ftp/tsg_ran/WG2_RL2/Outgoing_Liaisons/TSGR2_58/> [retrieved on Nov. 7, 2008.
Ran WG4 "Response LS on neighbour cell lists and reading neighbour cell P-BCH; R2-072950" 3GPP TSG-RAN2 Meeting #58BIS, [Online] Jun. 25, 2007, pp. 1-2, XP002504355, Retrieved from the Internet: URL://http://www.3gpp.org/ftp/tsg_ran/WG2_RL2/TSGR2_58bis/Docs/> [retrieved on Nov. 17, 2008].
QUALCOMM Europe: "Optional Reading of Qoffset in detected cells; R2-074113" 3GPP TSG-RAN WG2 #59BIS, [Online] Oct. 8, 2007, pp. 1-2, XP002504197, Retrieved from the Internet: URL:http://www.3gpp.org/ftp/TSG_RAN/WG2_RL2/TSGR2_59bis/Docs/> [retrieved on Nov. 17, 2008].
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8); ETSI TS 136.300" ETSI Standards, Lis, Sophia Antipolis Cedex, France, vol. 3-R2, No. V8.1.0, Jun. 1, 2007, XP014038500, ISSN: 0000-0001.
International Search Report—PCT/US2008/069357, International Search Authority—European Patent Office—Dec. 9, 2008.
Written Opinion—PCT/US2008/069357, International Search Authority—European Patent Office—Dec. 9, 2008.

* cited by examiner

PROCESSING QOFFSET PARAMETER

CROSS-REFERENCE TO RELATED APPLICATIONS

This application claims the benefit of U.S. Provisional Patent application Ser. No. 60/948,421 entitled "METHOD AND APPARATUS FOR PROCESSING QOFFSET PARAMETER" which was filed Jul. 6, 2007, the entirety of the aforementioned application is herein incorporated by reference.

BACKGROUND

I. Field

The following description relates generally to wireless communications, and more particularly to optional reading of Qoffset parameter, in detected cells by user equipment (UE) and processing of the Qoffset parameter.

II. Background

Wireless communication systems are widely deployed to provide various types of communication; for instance, voice and/or data, can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed, by the $N_T$ transmit and $N_R$ receive antennas can be decomposed into Ns independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward, link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, a mobile device can monitor and measure signal strengths of cells near the mobile device, and report the signal strengths to a base station serving the mobile device, to facilitate determining whether a particular neighboring cell has a signal strength that is stronger than the serving cell and whether a handover of the mobile device from the serving cell to a neighbor cell should be performed. With regard to signal strength of a cell, a cell can be associated with an offset value (e.g., Qoffset) that can be added to the measured signal strength in order to compensate for phenomena that affect the value of the measured signal strength to facilitate more accurate measurement of signal strength. Conventionally, for instance, with regard to Universal Mobile Telecommunication System (UMTS), the offset value is included as a parameter in a neighbor cell list that contains information regarding neighbor cells and is maintained by the serving base station. However, neighbor cells may not always be on the neighbor cell list transmitted in the serving cell, and as a result, information, such as the offset, of an unknown neighbor cell is not known to the serving base station. Consequently, the measured signal strength of the unknown neighbor cell cannot be normalized or adjusted (e.g., compensated) without the appropriate offset value. It is desirable to efficiently detect and read parameters, such as offset values, of cells (e.g., previously unknown neighbor cells). It is also desirable to enable flexibility by mobile devices with regard to reporting of parameter values (e.g., Qoffset) associated with cells, such as neighbor cells.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient connection and communication associated with a communication device (e.g., mobile device) within a network by employing one or more indicators related to parameters or attributes of cells (e.g., associated with neighbor base stations) detected and/or monitored by a communication device in a wireless communication environment. In one aspect, the communication device optionally can read a parameter value(s) associated with a detected neighbor cell, and can provide, to a serving base station, information related to the detected neighbor cell, where the information can include, for example, attribute values (e.g., measured signal strength), parameter value(s) (e.g., offset value that can optionally be read by the communication device), and one or more indicators that can indicate whether the communication device read the parameter value(s), whether the detected neighbor cell is associated with a closed subscriber group (CSG), whether the detected neighbor cell desires a one-to-one relationship with a base station with regard to particular parameter values (e.g., different parameter values employed for different cells as they relate to the neighbor cell), etc.

The serving base station can utilize the received information associated with the detected neighbor cell to facilitate updating its neighbor cell list to include the detected neighbor cell and information related therewith. The serving base station also can evaluate the received information (e.g., measured signal strength, offset, etc.) to facilitate selecting a cell to which the communication device is to be communicatively connected based in part on evaluation of the received information. Also, if a parameter value has not been read by the communication device, as determined by the serving base station based at least in part on the received indicator related to the parameter, the serving base station can request the parameter value from a neighbor cell using connectivity within the network (e.g., X2 or S1 interface). If a parameter value has been read by the communication device as determined by the serving base station based at least in part on the received indicator related to the parameter, the serving base station can request (e.g., optionally) the parameter value from a neighbor cell to facilitate verifying the parameter value. The serving base station also can employ an "unverified" indicator with regard to a parameter read by the communication device, and the "unverified" indicator can be stored in the neighbor cell list with other information relating to the neighbor cell at least until the serving base station has verified the parameter value.

According to related aspects, a method that facilitates communication associated with a mobile device is described herein. The method can include optionally reading at least one parameter value associated with at least one attribute related to a detected neighbor cell. Further, the method can comprise transmitting at least one indicator associated with the at least one parameter value to facilitate indicating whether the at least one parameter value has been read to facilitate communication associated with the mobile device based at least in part on the at least one indicator.

Another aspect relates to a wireless communications apparatus. The wireless communications apparatus can include a memory that retains instructions related to transmission of at least one indicator associated with optional read of at least one parameter value related to at least one attribute associated with a detected neighbor cell to facilitate communication associated with a mobile device based at least in part on the at least one indicator. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for interrogating a detected neighbor cell to request information related to communication associated with the mobile device to facilitate optionally reading at least one parameter value associated with at least one attribute related to the detected neighbor cell. Further, the wireless communications apparatus can comprise means for transmitting at least one indicator associated with the at least one parameter value associated with the detected neighbor cell to facilitate indicating whether the at least one parameter value has been read to facilitate communication associated with the mobile device based at least in part on the at least one indicator.

Still another aspect relates to a computer program product, comprising: a computer-readable medium comprising code for: optionally reading at least one parameter value associated with at least one attribute related to a detected neighbor cell; and transmitting at least one indicator associated with the at least one parameter value to facilitate indicating whether the at least one parameter value has been read to facilitate communication associated with the mobile device based at least in part on the at least one indicator.

In accordance, with another aspect, an apparatus in a wireless communication system can include a processor, wherein the processor can be configured to optionally read at least one parameter value associated with at least one attribute related to a detected neighbor cell. Moreover, the processor can be configured to transmit at least one indicator associated with the at least one parameter value to facilitate indication of whether the at least one parameter value has been read to facilitate communication associated with the mobile device based at least in part on the at least one indicator.

According to other aspects, a method that facilitates communication associated with a mobile device is described herein. The method can include receiving at least one indicator related to at least one parameter value associated with a detected cell. Further, the method can comprise selecting a base station to communicatively connect to the mobile device based at least in part on the at least one indicator.

Yet another aspect relates to a wireless communications apparatus that can include a memory that retains instructions related to reception of at least one indicator related to at least one parameter value associated with a detected cell to facilitate selection of a cell to communicatively connect to the mobile device based at least in part on the at least one indicator. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for receiving at least one indicator related to at least one parameter value associated with a detected cell. Further, the wireless communications apparatus can include means for selecting a cell to communicatively connect to the mobile device based at least in part oh the at least one indicator.

Still another aspect relates to a computer program product, comprising: a computer-readable medium comprising code for: receiving at least one indicator related to at least one parameter value associated with a detected cell, and selecting a cell to communicatively connect to the mobile device based at least in part on the at least one indicator.

In accordance with another aspect, an apparatus in a wireless communication system can include a processor, wherein the processor can be configured to receive at least one indicator related to at least one parameter value associated with a detected cell. Further, the processor can be configured to select a cell to communicatively connect to the mobile device based at least in part on the at least, one indicator.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
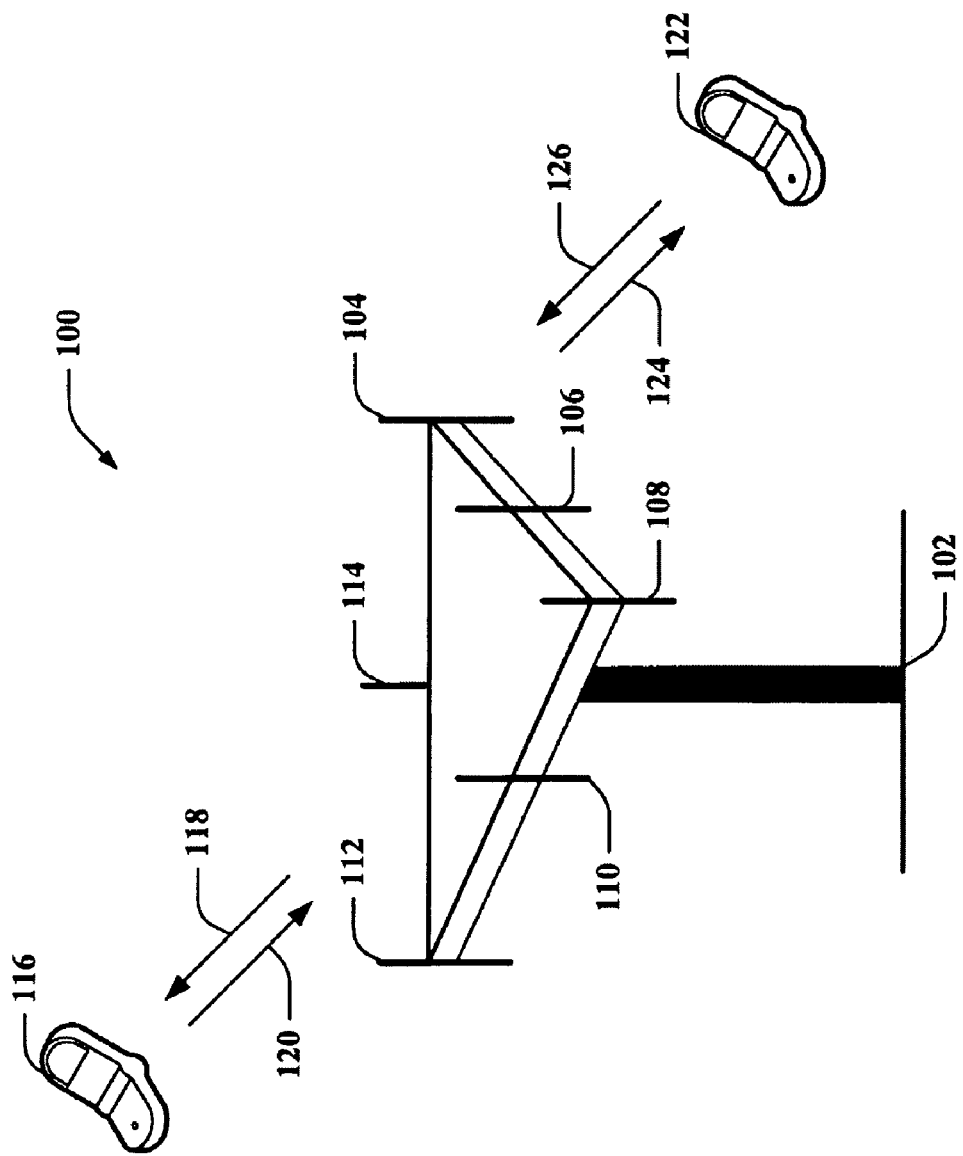
FIG. 1 is an illustration of a wireless communication system in accordance with various aspects set forth herein.

Various embodiments are now described with reference to the drawings, wherein like reference numerals are used to refer to like elements throughout. In the following description for purposes of explanation, numerous specific details are set forth in order to provide a thorough understanding of one or more embodiments. It may be evident, however, that such embodiments) may be practiced without these specific details. In other instances, well-known structures and devices are shown in block diagram form in order to facilitate describing one or more embodiments.

As used in this application, the terms "component," "module," "system," "detector," "interrogator," "attribute communicator," "indicator," "selector," "communicator," "evaluator," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMO, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks, (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instructions) and/or data.

Referring now to FIG. 1, a wireless communication system 100 is illustrated in accordance with various embodiments presented herein. System 100 comprises a base station 102 that can, include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn-comprise a plurality of components associated with signal transmission and reception (e.g., processors, modulators, multiplexers, demodulators, demultiplexers, antennas, etc.), as will be appreciated by one skilled in the art. It is to be appreciated that, while brie base station 102 is depicted in FIG. 1, the disclosed subject matter can comprise more than one base station in the network, such as, for example, a serving base station 102 and one or more neighbor base stations 102.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Typically, a mobile device can monitor and measure signal strengths of cells near the mobile device, and can report signal strengths to a serving base station serving the mobile device (e.g., facilitating communication by the mobile device 116 in the network), to facilitate determining whether a particular neighboring cell has a signal strength that is more desirable (e.g., stronger) than the serving base station (e.g., cell of the serving base station) and whether a handover of the mobile device from the serving base station to a neighbor cell should be performed. With regard to signal strength, each cell can be associated with an offset value(s) (e.g., Qoffset, such as one-to-one Qoffset or one-to-all Qoffset) that can be added to the measured signal strength, e.g., in order to compensate for phenomena that can affect the value of the measured signal strength. Conventionally, for instance, with regard to the Universal Mobile Telecommunication System (UMTS), an offset value can be included as a parameter in a neighbor cell list that contains information regarding neighbor cells and can be maintained by the serving base station. However, neighbor cells may not always be oh the neighbor cell list of the serving base station, and as a result, information, such as the offset value, of an unknown neighbor cell is not known to the serving base station. Consequently, the measured signal strength of the unknown neighbor cell cannot be normalized or adjusted (e.g., compensated) without the appropriate offset value.

It is to be appreciated and understood that a neighbor base station can be a base station that is operating a neighbor, cell(s) (e.g., a cell that is not currently serving the mobile device). A neighbor cell can be a cell associated with a neighbor base station that is a base station that neighbors the serving base station. A neighbor cell also can be a cell associated with the serving base station, where the neighbor cell neighbors a cell (of the serving base station) that is currently serving the mobile device.

In accordance with an aspect, a mobile device (e.g., 116) optionally can read parameter values (e.g., offset values, such as Qoffset, related to signal strength; Closed Subscriber Group (CSG) bit; etc.) respectively associated with one or more cells (e.g., associated with one or more base stations 102, such as a neighbor base station(s)) detected by the mobile device. The mobile device can detect and measure respective signal strengths of detected neighbor cells, as well as the serving base station 102, and optionally can read and/or report one or more parameters (e.g., Qoffset) respectively associated with the detected neighbor cells, as well as associated with the serving base station 102, to the serving base station 102. To facilitate accurate measurement and reporting of parameters, the mobile device can provide an indicators) (e.g., flag(s)) to the serving base station 102 that can indicate whether the parameter value of a particular parameter (e.g., offset, such as Qoffset, related to signal strength) has been read and/or whether a related attribute (e.g., measured signal strength) has been adjusted or normalized based in part on the particular parameter (e.g., offset).

For example, a mobile device (e.g., 116) can detect a neighbor cell and can measure signal strength and read the Qoffset value of the neighbor cell. The mobile device 116 can apply (e.g., optionally) the Qoffset value to the measured signal strength, and can transmit the signal strength (e.g., transmit a measurement report message), as adjusted by the Qoffset value, and an offset indicator (e.g., flag) that can be set to indicate that Qoffset has been read and applied to the transmitted signal strength (e.g., offset indicator set to TRUE), to the serving base station 102. The offset indicator, which can be set to indicate that, the Qoffset has been read by the mobile device 116, can facilitate informing the serving base station 102 that Qoffset has been read and applied by the mobile device (e.g., to compensate for signal strength level of the detected neighbor cell) to facilitate interpreting the signal strength level of the neighbor cell as reported by the mobile device 116. The serving base station 102 can utilize die information regarding the detected neighbor cell, including information regarding signal strength, the offset indicator, and/or other information, to facilitate determining whether a hand off of the mobile device 116 to another cell is to occur. Also, the information related to the detected neighbor cell can be utilized to modify its neighbor cell list, for instance, when the detected cell was not previously included in the neighbor cell list. The neighbor cell list can be broadcast to the mobile devices 116 and 122 by the serving base station 102.

In another aspect, if, for instance, a mobile device 116 reads a parameter value (e.g., offset value) associated with a neighbor cell and the read parameter value is different from a corresponding parameter value related to the neighbor cell as contained in the neighbor cell list stored by the mobile device 116, the mobile device 116 can transmit a message to the serving base station 102 with the read parameter value and a conflict indicator that can inform the serving base station 102 that the read parameter value does not match the corresponding parameter value stored in the neighbor cell list. Based in part on the received information (e.g., conflict indicator), the serving base station 102 can request the parameter value for which there is a conflict from the neighbor cell to obtain and/or verify the desired parameter value. The serving base station 102 can optionally update its neighbor cell list, if necessary, based in part on the parameter value received from the neighbor cell.

As another example, a mobile device (e.g., 116) can detect a neighbor cell and can receive information from the detected neighbor cell, where the information can include a CSG bit indicator that can indicate that the detected neighbor cell is associated with a private subscriber group (e.g., personal station of a user utilized for Internet access) and/or otherwise has a small coverage area. The mobile device 116 can transmit the information, including the CSG bit indicator, associated with the detected neighbor cell to the serving base station 102. The serving base station 102 can evaluate such information, and optionally can determine that since the detected neighbor cell is related to a CSG, the serving base station 102 will not include the detected neighbor cell in the neighbor cell, list; or, as desired, the serving base station 102 can update the neighbor cell list to include information regarding the detected neighbor cell.

Figure 2:
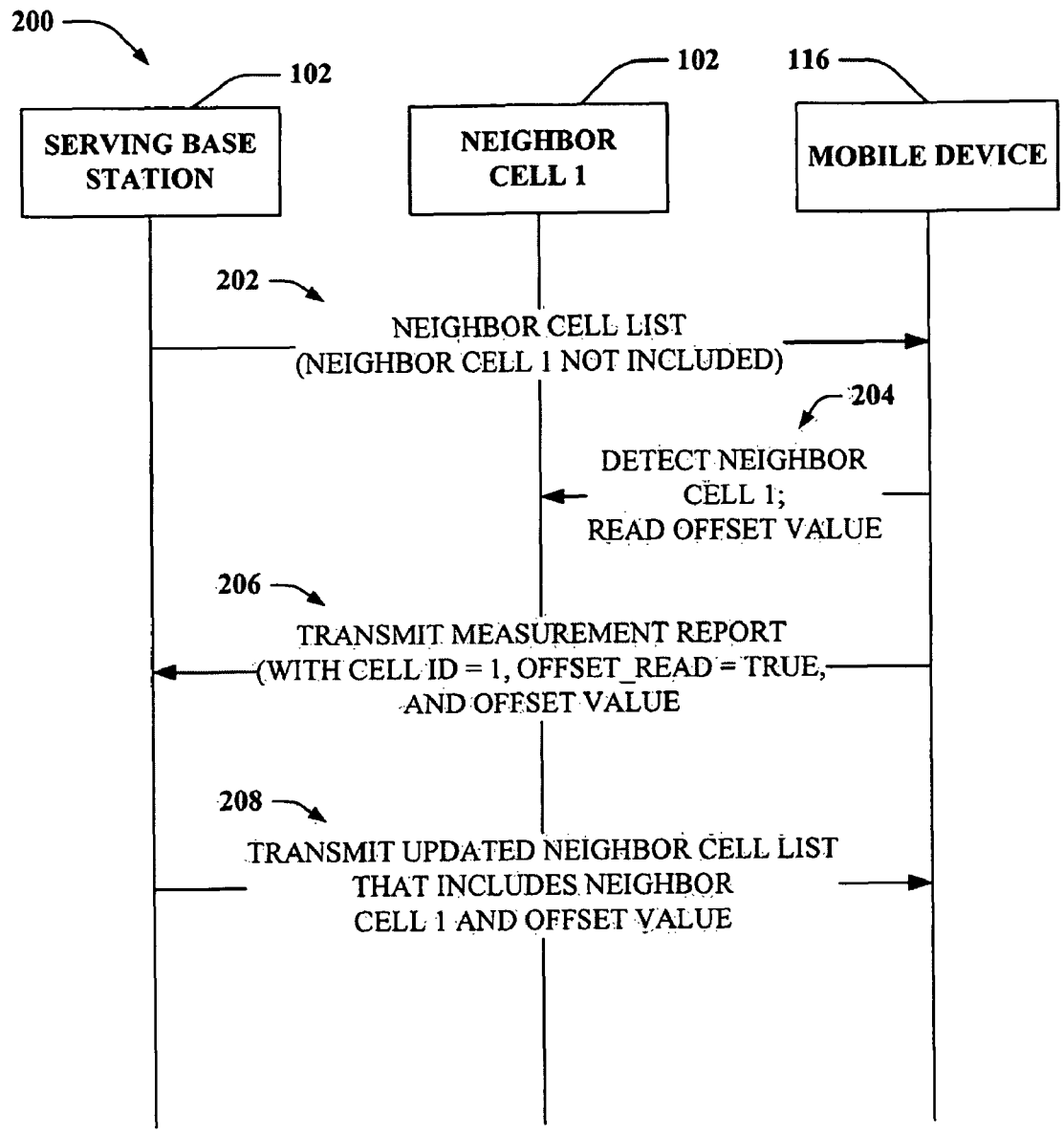
FIG. 2 is an illustration of an example diagram of a message flow relating to a detected neighbor cell associated with a mobile device within a wireless communication environment in accordance with an aspect of the disclosed subject matter.

Turning briefly to FIG. 2, illustrated is an example diagram 200 of message flow relating to a detected neighbor cell in accordance with an aspect of the disclosed subject matter. In accordance with an aspect, the serving base station 102 can transmit a neighbor cell list to a mobile device (e.g., 116), where the neighbor cell list does not include neighbor cell 1 (202). The mobile device 116 can detect neighbor cell 1 and can read a parameter(s) (e.g., Qoffset) (204). The mobile device 116 can include the parameter value(s)) an indicators) (e.g., offset indicator) that can indicate that the parameters) has been read, and a measured attribute (e.g., signal strength) related to the read parameters), in a message (e.g., measurement report message) to the serving base station 102 (206). The serving base station 102 in the network can use the reported parameter value(s), indicator information, and/or other information associated with neighbor cell 1 to populate and/or update a neighbor cell list of known neighbor cells. The serving base station 102 can transmit an updated neighbor cell list that includes information, such as cell identification and the offset value, related to the neighbor cell 1 to the mobile device 116 (208).

Referring again to FIG. 1, in yet another aspect, as desired, when the serving base station 102 receives a report regarding a parameters) and/or attribute(s) associated with a detected neighbor cell from a mobile device (e.g., 116), the serving base station 102 can provide an "unverified" indicator that can indicate that the received parameter value(s) is unverified, unreliable, and/or volatile and the "unverified" indicator can be stored with other information regarding the detected neighbor cell in the neighbor cell list, which can be broadcast by the serving base station 102 to mobile devices 116 and 122 associated with the serving base station 102. This can facilitate maintaining an accurate neighbor cell list, as the serving base station 102 can desire to verify that a parameter(s) of a detected neighbor cell reported by a mobile device is accurate, and also the serving base station 102 may not know when a parameter value(s) (e.g., Qoffset) in a neighbor base cell changes.

In still another aspect, a serving base station 102 can have the ability to communicate with a detected neighbor cell and can determine a parameter value(s) (e.g., Qoffset, CSG bit) associated with a detected neighbor cell or confirm a parameter value(s) reported by a mobile device to the serving base station 102. The communication between the serving base station 102 and a neighbor cell can be facilitated via any route that can be established between the serving base station 102 and the neighbor cell. For example, the communication between the serving base station 102 and a neighbor cell can be facilitated via an X2, interface or by routing through a mobility management entity (MME).

Figure 3:
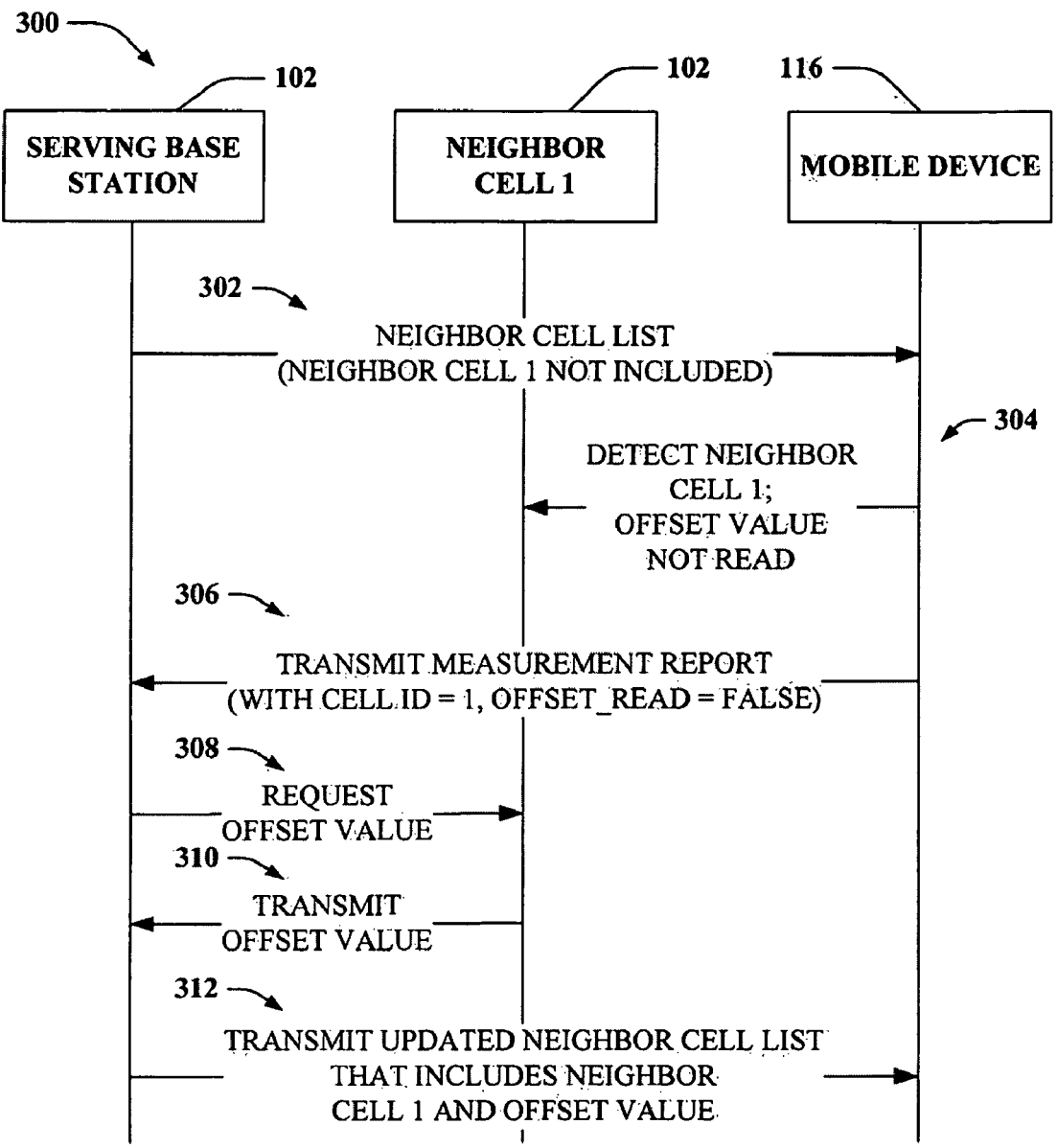
FIG. 3 is a depiction of an example diagram of a message flow relating to a detected neighbor cell associated with a mobile device within a wireless communication environment in accordance with an aspect of the disclosed subject matter.

Turning briefly to FIG. 3, depicted is an example diagram 300 of message flow relating to a detected neighbor cell in accordance with an aspect of the disclosed subject matter. As an example, a serving base station 102 can transmit a message that includes a neighbor cell list to a mobile device 116, where the neighbor cell list does not include neighbor cell 1 (302). The mobile device 116 can detect neighbor cell 1, can measure the signal strength of neighbor cell 1, and optionally can decide to not read the offset (e.g., Qoffset) of neighbor cell 1 (304). The mobile device 116 can transmit a measurement report to the serving base station 102, where the measurement report can provide information regarding the signal strength of detected neighbor cell 1 and an offset indicator that can be set to indicate that the Qoffset was not read (e.g., offset indicator can be set to FALSE) (306). The serving base station 102 can transmit a request for the offset value to neighbor cell 1 (308). Neighbor cell 1 can transmit its offset value to the serving base station 102 (310). The serving base station 102 can update its neighbor cell list to include information, such as the offset value and cell identification, associated with neighbor cell 1. The serving base station 102 can transmit the updated neighbor cell list to the mobile device 116 to facilitate communication with the mobile device in the network (312).

Referring again to FIG. 1, in another aspect, a neighbor cell can have a parameter that can have different values for use with different base stations 102. For example, a neighbor cell (e.g., neighbor cell detected by a mobile device) can have a one-to-one relationship with each base station, where a Qoffset parameter (e.g., one-to-one Qoffset) used by the neighbor cell can have a different value depending in part on the base station 102 (e.g., cell of a base station 102) with which the neighbor cell is associated. Examples where this can occur can be related to the "tunnel cell" scenario, where a mobile device 116 is moving through a tunnel (e.g., mobile device 116 is in a car moving through a tunnel where a cell(s) is employed) and/or cells along a highway where a mobile device 116 is moving, although there are other scenarios where a one-to-one Qoffset can be desired. In such instances where a one-to-one relationship is desired between a neighbor cell and a base station (e.g., cell of a base station 102) with regard to a parameter, the neighbor cell can have a parameter that can have different values depending on the base station 102 associated therewith, and die neighbor cell can transmit no information with regard to the particular parameter or can transmit an indicator (e.g., flag), such as a one-to-one indicator, that can indicate the neighbor cell is signaling the use of a one-to-one parameter value to be used in relation to a particular base station 102 (e.g., serving base station 102). The one-to-one indicator can be transmitted to the mobile device, which can forward the indicator to the serving base station 102, or can be transmitted directly to the serving base station 102, if requested by the serving base station 102. The mobile device also can measure attributes, such as signal strength, and can provide the measured attributes to the serving base station 102. The serving base station 102 can contact the neighbor cell to obtain the value for the desired parameters) (e.g., Qoffset). The parameter value(s) provided by the neighbor cell to the serving base station 102 can depend in part on the particular serving base station 102, and different parameter values can be provided to different base stations 102.

Figure 4:
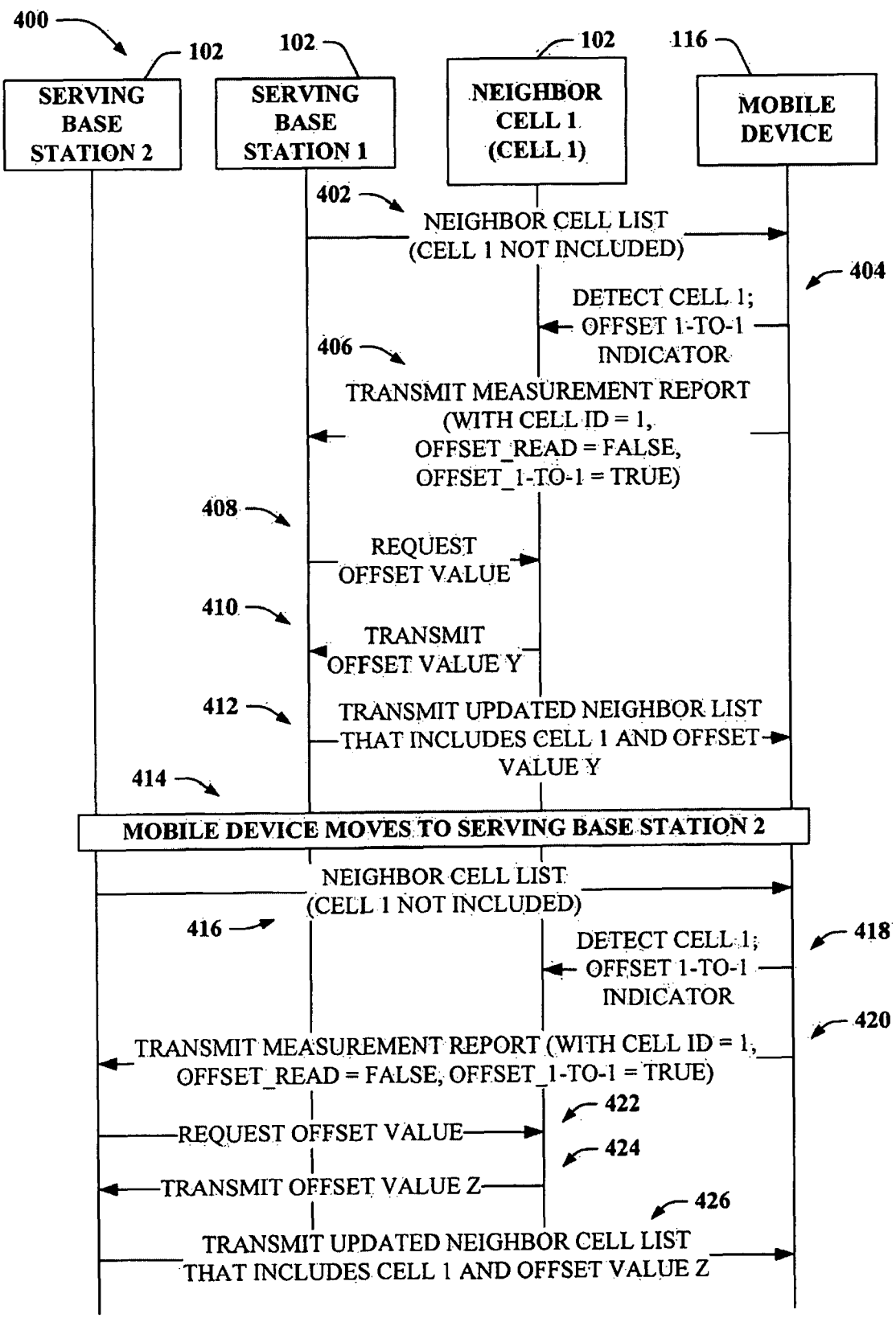
FIG. 4 is a depiction of an example diagram of a message flow relating to a detected neighbor cell with respective one-to-one relationships between the detected neighbor cell and other cells in a wireless communication environment in accordance with an aspect of the disclosed subject matter.

Referring briefly to FIG. 4, illustrated is an example diagram 400 of a message flow relating to a detected, neighbor cell with respective one-to-one relationships between the detected neighbor cell and other cells in accordance with an aspect of the disclosed subject matter. For instance, a first base station 102 (e.g., serving base station 1) can transmit a first, neighbor cell list that does not include a particular neighbor cell (e.g., neighbor cell 1) to a mobile device. 116 (402). The mobile device 116 can detect neighbor cell 1 and can read a one-to-one indicator associated with the offset (e.g., Qoffset) of neighbor cell 1 where such indicator can be set to indicate that the neighbor cell can have different offset values for different base stations 102 (e.g., different cell(s) of a base station(s) 102) (404). The mobile device 116 also can measure the signal strength and/or other attributes associated with neighbor cell 1, but typically will not read the offset value, as the particular offset value to be used can be based at least in part on the base station (e.g., serving base station 1) with which neighbor cell 1 is to be associated. The mobile device 116 can send a measurement report that can include information, such as the signal strength, an offset indicator (e.g., Qoffset_read=FALSE), and a one-to-one indicator (e.g., Qoffset_one-to-one indicator=TRUE), related to the neighbor cell 1 to the first base station 102 (406). The first base station 102 can request the offset value from neighbor cell 1 (408). Neighbor cell 1 can provide the desired offset value (e.g., Qoffset=Y db) applicable to the first base station 102 to the first base station 102 (410). The first base station 102 can modify its neighbor cell list to include information, such as cell identification and the offset value, regarding neighbor cell 1. The first base station 102 can transmit the modified neighbor cell list to the mobile device 116 (412). The mobile device 116 can be handed over to a second base station 102 (e.g., serving base station 2) (414).

In a similar manner, the second base station 102 can transmit its neighbor cell list that does not include neighbor cell 1 to the mobile device 116 (416). The mobile device 116 can detect neighbor cell 1 and can read a one-to-one indicator associated with the offset (e.g., Qoffset) of neighbor cell 1 where the one-to-one indicator can be set to indicate that neighbor cell 1 can have different offset values for different base stations 102 (418). The mobile device 116 also can measure the signal strength and/or other attributes associated with neighbor cell 1, but typically will not read the offset value, as the particular offset value to be used can be based at least in part on the base station (e.g., serving base station 2) with which neighbor cell 1 is to be associated. The mobile device 116 can send a measurement report that can include information, such as the signal strength, offset indicator (e.g., Qoffset_read=FALSE), and a one-to-one indicator (e.g., Qoffset_one-to-one indicator=TRUE, related to neighbor cell 1 to the second base station 102 (420). The second base station 102 can request the Qoffset value from the neighbor cell (422). Neighbor cell 1 can provide a disparate Qoffset value (e.g., different from the Qoffset value associated with the first base station 102, such as Qoffset=Z db) that is applicable to the second base station 102 to the second base station 102 (424). The second base station 102 can modify its neighbor cell list to include information, such as cell identification and the disparate offset value, regarding neighbor cell 1. The second base station 102 can transmit the modified neighbor cell list to the mobile device 116 (426).

Referring again to FIG. 1 in yet another aspect, a neighbor cell can send an indicator that it desires one-to-one Qoffset values rather than one-to-all Qoffset values (e.g., same Qoffset value used with all base stations). The indicator information can be propagated to a serving base station 102 in uplink signaling from a mobile device (e.g., 116) to facilitate enabling the serving base station 102 to request the appropriate Qoffset value from the reported neighbor cell.

Figure 5:
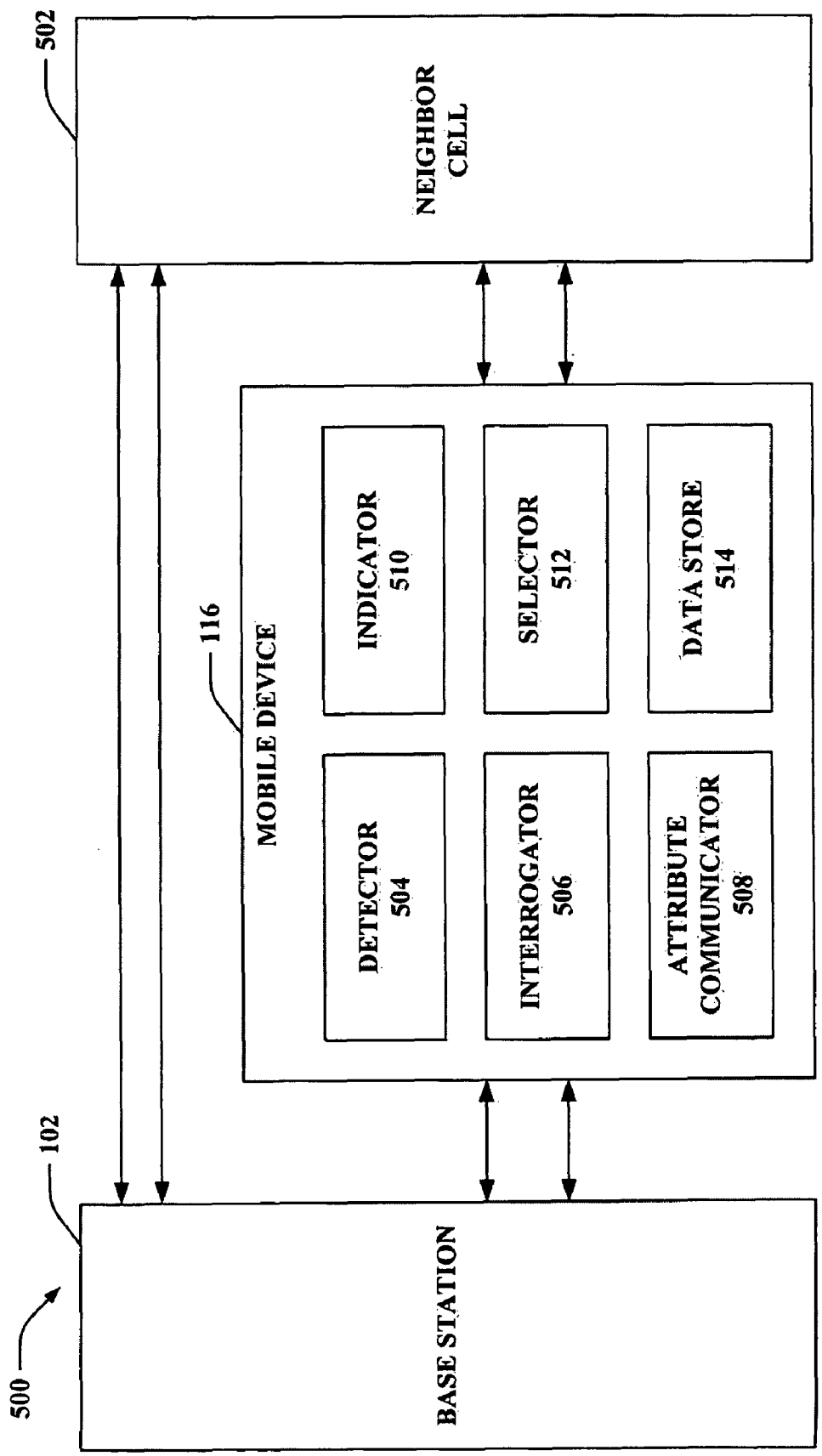
FIG. 5 is a depiction of an example system that can facilitate communication associated with a mobile device within a wireless communication environment in accordance with an aspect of the disclosed subject matter.

With reference to FIG. 5, illustrated is a system 500 that can facilitate communication associated with a mobile device within a wireless communication environment in accordance with an aspect of the disclosed subject matter. System 500 can include a base station 102 (e.g., serving base station 102) that can communicate with one or more mobile devices, such as mobile device 116. It is to be appreciated and understood that only one mobile device is depicted in FIG. 5 for clarity and brevity. Moreover, base station 102 can communicate with another base station(s) (e.g., neighbor base station(s)) and/or any disparate devices (e.g., servers) (not shown) that can perform functions such as, for example, authentication, authorization, etc. The base station 102 and mobile device 116 each can be respectively the same or similar as, and/or can comprise respectively the same or similar functionality as, respective components, such as more fully described herein, for example, with regard to system 100, diagram 200, diagram 300, and/or diagram 400.

The mobile device 116 can be communicatively connected (e.g., wirelessly connected) with the base station 102 (e.g., servicing base station 102), where the connection can comprise a data channel and a control channel. The data channel can facilitate transmission of data between the mobile device 116 and the base station 102, and the control channel can facilitate the transmission of control information between the mobile device and the base station 102.

In one aspect, the mobile device 116 can detect and obtain information from one or more neighbor cells 502 associated with a neighbor base station (e.g., base station 102) to facilitate communication by the mobile device 116 in the network. Each neighbor cell 502 can be the same or similar as, and/or can comprise the same or similar functionality as, a neighbor cell, such as more fully described herein, for example, with regard to system 100, diagram 200, diagram 300, and/or diagram 400. It is to be appreciated and understood that, while the neighbor cell is depicted as separate from the base station 102, the neighbor cell can be associated with a neighbor base station, which can be a base station that neighbors the serving base station 102 or can be the serving base station 102 itself. The mobile device 116 can include a detector 504 that can detect one or more neighbor cells 502 (as well as a serving base station 102), such as a neighbor cell(s) 502 that is located in the vicinity of the mobile device 116. In another aspect, the mobile device 116 can include an interrogator 506 that can interrogate and/or request information, such as signal strength, offset information, CSG bit information, indicator information, identification information, and/or other information, associated with a neighbor cell 502 and/or a serving base station 102 to facilitate determinations related to selecting neighbor cell 502 (or maintaining communication with a serving cell associated with a serving base station (e.g., 102)). For example, the mobile device 116 can monitor signal strength and the interrogator 506 optionally can request and/or read one or more of various parameters, such as an offset value (e.g., Qoffset) and/or a CSG bit, associated with a detected neighbor cell 502.

In still another aspect, the mobile device 116 can comprise an attribute communicator 508 that can facilitate transmitting attribute and/or parameter information to the serving base station 102. The attribute communicator 508 can transmit signal strength, offset information, indicator information (e.g., offset indicator, one-to-one indicator, CSG bit indicator, etc.), identification information, and/or other information associated with a detected neighbor cell 502 to the serving base station 102. For example, the attribute communicator 508 can transmit messages, such as measurement reports related to the signal strength of detected neighbor cells 502 to facilitate determining whether the serving base station 102 is to hand off the mobile device 116 to a neighbor cell 502. The attribute and parameter information can be evaluated by the serving base station 102 to facilitate determinations related to selecting a neighbor cell 502 with which the mobile device 116 is to connect to communicate in the network (or maintaining connection with the serving base station 102).

In another aspect, the mobile device 116 can include an indicator 510 that can work in conjunction with the attribute communicator 508 to facilitate transmitting indicator information related to various parameters associated with a cell (e.g., neighbor cell 502) to the serving base station 102. For example, the indicator 510 can facilitate transmitting an offset indicator that can indicate whether the mobile device 116 read the offset (e.g., Qoffset) of the detected neighbor cell 502 and is reporting a combined value of the offset value combined with the measurement report (e.g., the mobile device has added the offset value to the measured signal strength of the neighbor cell 502). As another example, the indicator 510 can facilitate transmitting an indicator (e.g., flag) that can indicate whether a GSG bit associated with a neighbor cell 502 has been read and/or is being reported in the message to the serving base station 102.

In yet another aspect, the mobile device 116 can contain a selector 512 that can facilitate selecting a cell, (e.g., serving cell of a serving base station 102, neighbor cell 502) to which the mobile device 116 is to communicatively connect for data or voice communications in the network. The cell to which the mobile device, 116 is to be connected or switched to (or remain connected to) can be determined based at least in part on predefined selection criteria. The selection criteria can relate to, for example, relative location of the mobile device 116, the serving base, station 102, and/or a neighbor cell(s) 502; respective signal strengths of the cells (e.g., serving cell of the serving base station 102, neighbor cell(s) 502); GSG bit information; and/or other criteria.

In another aspect, the mobile, device 116 can comprise a data store 514 that can store information, such as signal strength, offset information, indicator information (e.g., offset indicator, one-to-one indicator, GSG bit indicator, etc.), identification information, neighbor cell lists, and/or other information, related to base stations (e.g., serving base station 102, neighbor base station(s) 502) and cells (e.g., neighbor cell 502), and/or information related to the mobile device 116 and communication in the wireless communication, environment. When establishing a connection with a base station (e.g., 102), detecting cells 502, or otherwise interacting with base stations or cells, the mobile device 116 can retrieve desired information (e.g., neighbor cell list, offset information, etc.) from the data store 514 and can provide retrieved information to the serving base station 102 to facilitate communication by the mobile device 116 in the network.

In accordance with an aspect, the data store 514 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration, and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 514 is intended to comprise, without being limited to, these and any other suitable types of memory.

Figure 6:
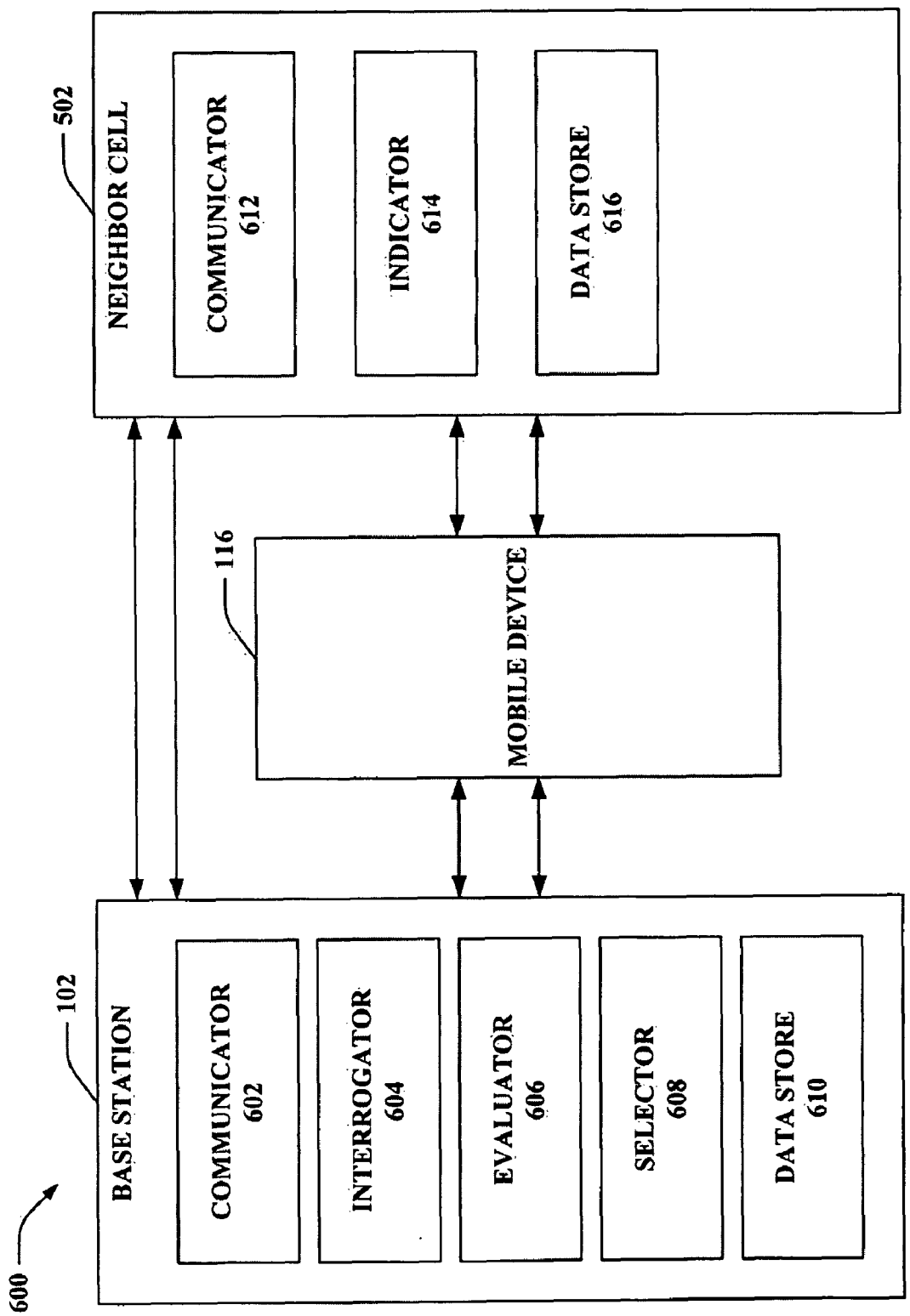
FIG. 6 is an illustration of another example system that can facilitate communications associated, with a mobile device in a wireless communication environment in accordance with an aspect of the disclosed subject matter.

Referring to FIG. 6, depicted is a system 600 that can facilitate communications associated with a mobile device in a wireless communication environment in accordance with an aspect of the disclosed subject matter. System 600 can include a base station 102 that can communicate with one or more mobile devices, such as mobile device 116 it is to be appreciated and understood that only one mobile device 116 is depicted in FIG. 6 for clarity and brevity. Also, base station 102 can communicate with another base station(s), a cell(s) (e.g., neighbor cell 502), and/or any disparate devices (e.g., servers) (not shown) that can perform functions such as, for example, authentication, authorization, etc. It is to be appreciated that one neighbor cell 502 is illustrated for clarity and brevity, but the disclosed subject matter can include a plurality of neighbor cells 502. The base station 102, mobile device 116, and neighbor cell 502 each can be respectively the same or similar as, and/or can comprise respectively the same or similar functionality as, respective components, such as more fully described herein, for example, with regard to system 100, diagram 200, diagram 300, diagram 400, and/or system 500.

Mobile device 116 can be communicatively connected (e.g., wirelessly connected) with the base station 102 (e.g., serving base station 102), where the connection can comprise a data channel and a control channel, for example. In one aspect, the mobile device 116 can transmit information, including signal strength, offset information, CSG bit information, indicator information, identification information, and/or other information, associated with a neighbor cell(s) 502 to a serving base station 102, and the information can be stored by the serving base station 102.

In one aspect, a base station (e.g., serving base station 102) can include a communicator 602 that can facilitate communication of information between the base station and the mobile device 116, and/or between the base station and another base station, and/or between the base station and other devices (not shown). For example, the communicator 602 can facilitate communicating information between base stations (and/or cells) via an X2 interface or by routing information through an MME.

In another aspect, a base station (e.g., serving base station 102) can comprise an interrogator 604 that can facilitate interrogating, and/or requesting information from, the mobile, device(s) 116, another base station(s), a cell(s) (e.g., neighbor cell 502), and/or another device(s). For instance, if the mobile device 116 provides indicator information, to a serving base station 102, indicating that the mobile device 116 did not read the offset value of a neighbor cell 502, or if the serving base station 102 desires to verify an offset value of a neighbor cell 502 received from the mobile device 116, the interrogator 604 of the serving base station 102 can request the offset value from the neighbor cell 502.

In yet another aspect, a base station (e.g., serving base station 102) can comprise an evaluator 606 that can evaluate information, such as respective signal strengths of the neighbor cell(s) 502 and serving base station 102, respective offset values (e.g., Qoffset) of the neighbor cell(s) 502 and serving base station 102; respective CSG bit information; predefined selection criteria; and/or other information to facilitate determining whether the mobile device 116 is to be handed over to another cell (e.g., neighbor cell 502) or the serving cell of the serving base station 102 is to continue serving the mobile device 116. A base station can further include a selector 608, and the evaluator 606 can provide results from the evaluation (s) to the selector 608. The selector 608 can determine whether the mobile device 116 is to be handed over to another cell (e.g., neighbor cell 502) or the serving cell of the serving base station 102 is to continue serving the mobile device 116, and can select a desired neighbor cell 502, if it is determined that a hand off is to occur, based at least in part on predefined selection criteria.

In still another aspect, a base station (e.g., serving base station 102) can contain a data store 610 that can store information, such as signal strength, offset information, CSG bit information, indicator information, identification information, neighbor cell list, and/or other information, related to a base station(s) (e.g., serving base station 102, neighbor base station(s)), information related to the mobile device 116, and/of information otherwise, related to communication in the wireless communication environment.

In accordance with an aspect, the data store 610 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 610 is intended to comprise, without being limited to, these and any other suitable types of memory.

In accordance with an aspect, the neighbor cell, 502 can include a communicator 612 that can facilitate communication of information (e.g., data, attribute information, indicator information, etc.) between the neighbor cell 502 and the mobile device 116, and/or between the neighbor cell 502 and a base station (e.g., serving base station 102), and/or between the neighbor cell 502 and other devices (not shown). For example, the communicator 602 can facilitate communicating information between base stations and/or cells via an X2 interface or by routing information through an MME.

In another aspect, the neighbor cell can comprise an indicator 614 that can facilitate transmitting indicator information related to various parameters associated with the neighbor cell 502 to the mobile device 116 and/or the serving base station 102. For example, the indicator 614 can facilitate transmitting a one-to-one indicator (e.g., flag) that when set (e.g., set to TRUE) can indicate that the neighbor cell desires a one-to-one relationship with, respective base stations 102 with regard to an Offset parameter value (e.g., different base stations can have different offset parameter values), or when not set (e.g., set to FALSE) can indicate that the neighbor cell 502 desires a one-to-all relationship with base stations 102 with regard to the offset parameter value (e.g., same offset parameter value used for all base stations 102). The indicator 614 also can provide a CSG indicator bit that can indicate whether the neighbor cell 502 is associated with a CSG.

In still another aspect, the neighbor cell 502 can contain a data store 616 that can store information, such as offset information, CSG bit information, indicator information, identification information, and/or other information, related to the neighbor cell 502, and/or information otherwise related to communication in the wireless communication environment. In accordance with an aspect, the data store 616 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 616 is intended to comprise, without being limited to, these and any other suitable types of memory.

Figure 7:
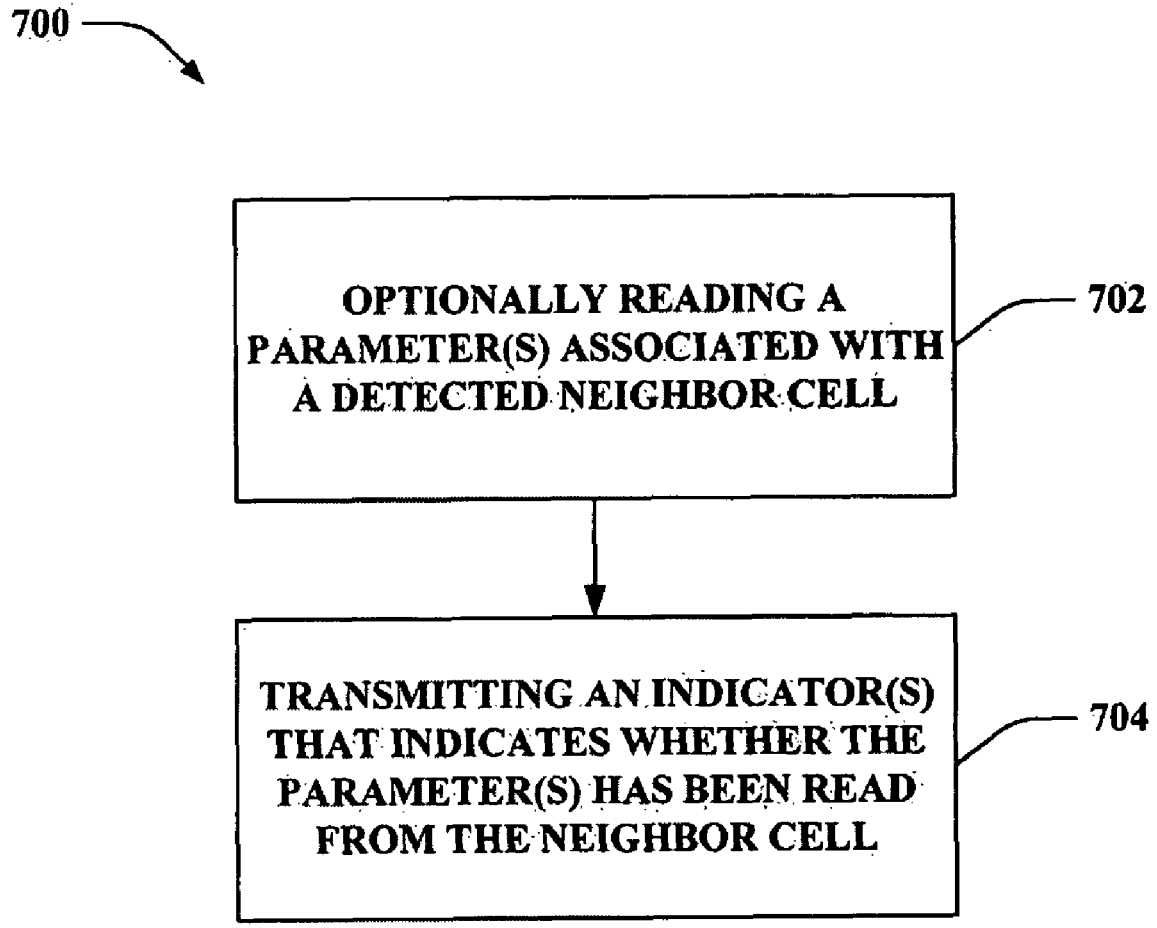
FIG. 7 is an illustration of an example methodology that can facilitate communications associated with a mobile device in a wireless communication system in accordance with an aspect of the disclosed subject matter.
Figure 8:
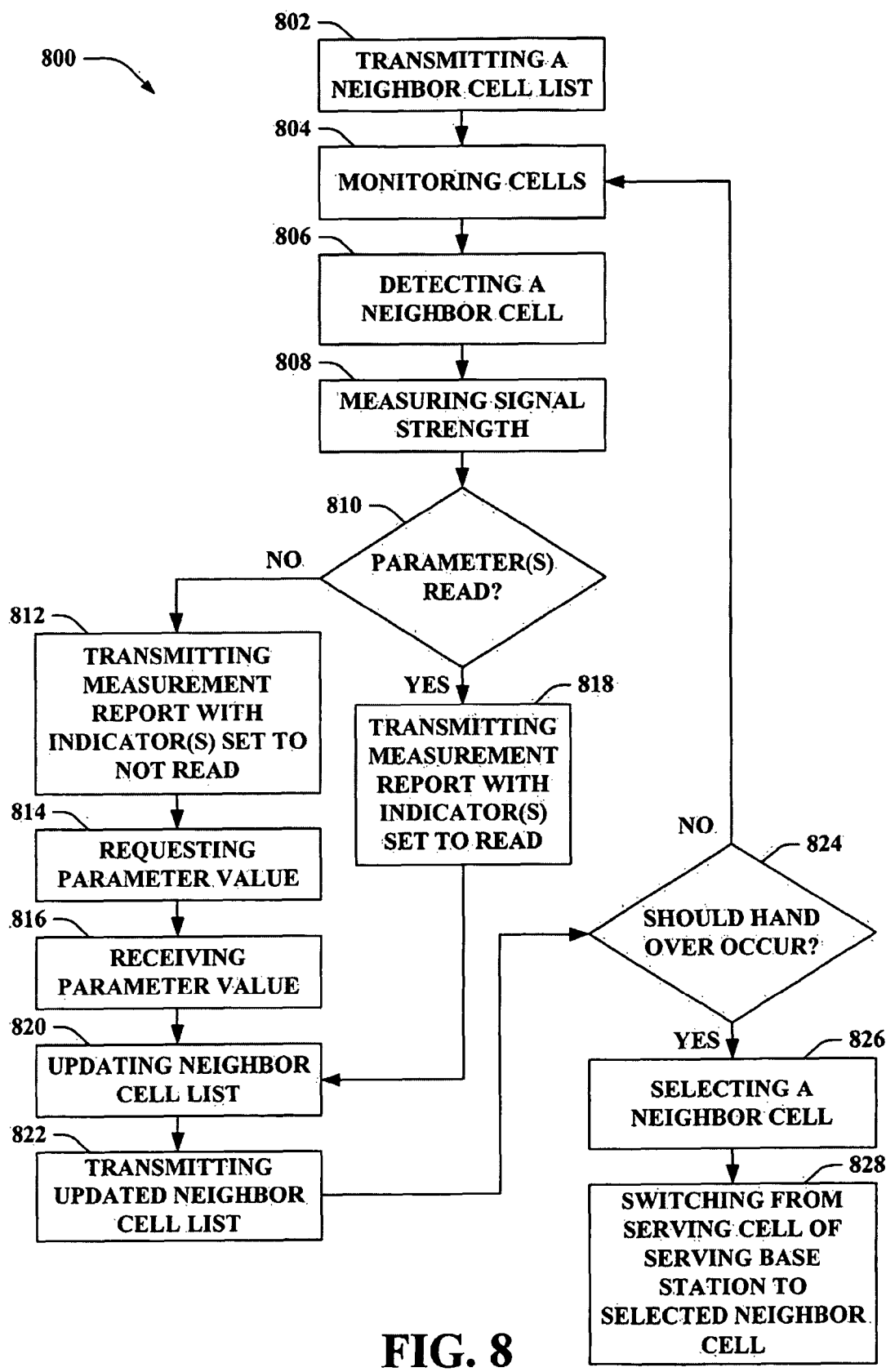
FIG. 8 is a depiction of an example, methodology that can facilitate optional reading of parameter values of a detected neighbor cell by a mobile device to facilitate communications by the mobile device in a wireless communication system in accordance with an aspect of the disclosed subject matter.
Figure 9:
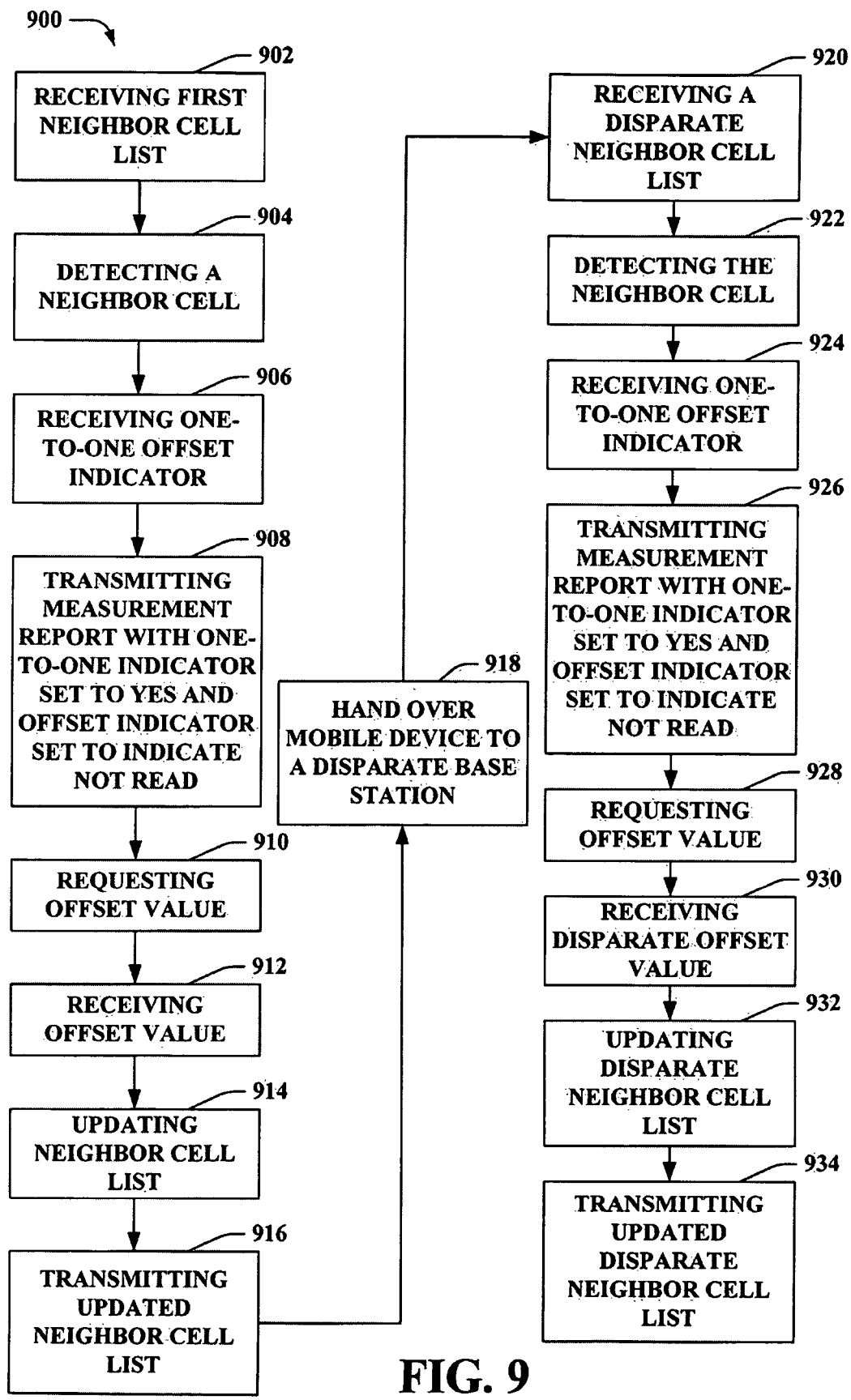
FIG. 9 is an illustration of ah example methodology that can employ a one-to-one indicator to facilitate communications associated with a mobile device in a wireless communication system in accordance with an aspect of the disclosed subject matter.

Referring to FIGS. 7-9, methodologies relating to optionally reading parameters) associated with a detected neighbor cell (e.g., 502) and providing an indicators) regarding whether the parameters) was read by the mobile device (e.g., 116) to facilitate communication by the mobile device in a network (e.g., base station 102, core network) are illustrated. While, for purposes of Simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that can facilitate communications associated with a mobile device in a wireless communication system in accordance with an aspect of the disclosed subject matter. At 702, a parameters) associated with a detected neighbor cell (e.g., 502) optionally can be read. In one aspect, a mobile device (e.g., 116) optionally can read one of more parameters, such as, for example, offset (e.g., Qoffset) and/or GSG bit, associated with a detected neighbor cell 502.

At 704, an indicators) associated with the parameter that indicates whether the parameter has been read from the detected neighbor cell can be transmitted. In accordance with an aspect, the mobile device 116 can set an indicator to a particular value based at least in part on whether the mobile device 116 has read a parameter associated with the detected neighbor cell 502. The mobile device 116 also can measure signal strength and/or other attributes associated with the detected neighbor cell 502. If the mobile device 116 has read the offset value of the detected neighbor cell 502, the mobile device 116 can add the offset value to the measured signal strength, and can transmit, to a serving base station 102, a measurement report containing the combined value of the offset and measured signal strength as well as an offset indicator that can be set to indicate that the offset value was read and applied to the measured signal strength by the mobile device 116. If the mobile device 116 has not read the offset value of the detected neighbor cell 502, the mobile device 116 can transmit, to the serving base station 102, a measurement report containing the measured signal strength as well as an offset indicator that can be set to indicate that the offset value was not read by the mobile device 116.

Turning to FIG. 8, illustrated is a methodology 800 that can facilitate optional reading of parameter values of a detected neighbor cell by a mobile device to facilitate communications by the mobile device in a wireless communication system in accordance with an aspect of the disclosed subject matter. At 802, a neighbor, cell list can be transmitted. In one aspect, a serving base station 102 can transmit a neighbor cell list to the mobile device (e.g., 116) that the serving base station 102 is serving. The neighbor cell list can include detected neighbor cells 502 of which the serving base station 102 is aware. At 804, signals associated with a cell(s) (e.g., neighbor cell(s)) can be monitored. In one aspect, the mobile device 116 can monitor signal strengths respectively associated with cells (e.g., neighbor cells 502) and/or the serving base station 102 (e.g., serving cell of the serving base station 102) to facilitate detection of neighbor cells 502 and determinations regarding selecting a desired (e.g., optimal) cell to which the mobile device 116 can be connected to facilitate efficient communications in the network.

At 806, a neighbor cell can be detected. In one aspect, the mobile device 116 can detect a neighbor cell(s) 502. At 808, the signal strength of the detected neighbor cell 502 can be measured. In one aspect, the mobile device 116 can measure the signal strength of the detected neighbor cell 502.

At 810, a parameter value optionally can be read. In one aspect, the mobile device 116 optionally can read a parameter value associated with the detected neighbor cell 502. For instance, the mobile device 116 optionally can read an offset value related to the signal strength, CSG bit value, and/or another parameters) associated with the detected neighbor cell 502.

If at 810, a parameter value is not read, at 812, a measurement report that includes indicator information associated with the parameter that can indicate that the parameter value has not been read can be transmitted. In one aspect, the mobile device 116 can set an indicator associated with a parameter to indicate that the parameter value (e.g., Qoffset) has not been read, when the mobile device 116 did not read the parameter value. The mobile device 116 can transmit, to the serving base station 102, a measurement report that can include information regarding measured signal strength of the detected neighbor cell 502 and the indicator (e.g., offset indicator) that can indicate that the parameter value (e.g., Qoffset) has not been read by the mobile device 116. At 814, the parameter value can be requested. In accordance with an aspect, the serving base station 102 can request the desired parameter value (e.g., Qoffset) from the detected neighbor cell 502. At 816, the parameter value can be received. In one aspect, the detected neighbor cell 502 can receive the request for the parameter value and can transmit the desired parameter value to the serving base station 102, which can receive the desired parameter value. At this point, methodology 800 can proceed to reference numeral 820.

If at 810, a parameter value is read, at 818, a measurement report that includes indicator information associated with the parameter that can indicate the parameter value has been read can be transmitted. In one aspect, the mobile device 116 can set an indicator associated with a parameter to indicate that the parameter value (e.g., Qoffset) has been read from the detected neighbor cell 502, when the mobile device 116 has read the parameter value. The mobile device 116 can apply a read parameter value, such as Qoffset, to the measured signal strength. The mobile device 116 can transmit, to the serving base station 102, a measurement report that can include information regarding signal strength (e.g., measured signal strength combined with Qoffset) of the detected neighbor cell 502 and the indicator (e.g., offset indicator) that can indicate that the parameter value (e.g., Qoffset) has been read (and/or combined with the measured signal strength) by the mobile device 116.

In accordance with another aspect, as desired, when the serving base station 102 receives the measurement report indicating that the parameter value has been read, the serving base station 102 can set an "unverified" indicator that can indicate the received parameter value, as read by the mobile device 116, is unverified, unreliable, and/or volatile. In such instance, the serving base station 102 can request the desired parameter value (e.g., Qoffset) from the detected neighbor cell 502. The detected neighbor cell 502 can receive the request for the parameter value and can transmit the desired parameter value to the serving base station 102, which can receive the desired parameter value. At this point, methodology 800 can proceed to reference numeral 820.

At 820, the neighbor cell list can be updated. In one aspect, the serving base station 102 can update the neighbor cell list to include the detected neighbor cell 502. The updated neighbor cell list can include information related to the detected neighbor cell 502 (e.g., identification information, parameter information, attribute information, etc.). At 822, the updated neighbor cell list can be transmitted. In accordance with an aspect, the serving base station 102 can transmit the updated neighbor cell list to the mobile device 116.

At 824, a determination can be made regarding whether the mobile device is to be handed over to a neighbor base station. In one aspect, the serving base station 102 can evaluate respective signal strengths and/or respective offset information associated with detected neighbor cells 502 and the serving base station 102 to facilitate determining whether the mobile device 116 is to be handed over to a particular neighbor cell 502 or is to continue to be served by the serving cell of the serving base station 102. If, at 824, it is determined that no hand over should occur (e.g., the serving cell of the serving base station 102 is to continue serving the mobile device 116), methodology 800 can return to reference numeral 804, where the signals of cells (e.g., 502) can be monitored, for example, by the mobile device 116.

If, at 824, it is determined that a hand over should occur (e.g., the mobile device 116 is to be handed over from the current serving base station 102 to a desired neighbor cell 502), at 826, a neighbor cell can be selected. In one aspect, the serving base station 102 can select a desired neighbor cell to which the mobile device 116 can be handed over based at least in part on the evaluation of respective signal strengths and/or respective offset information associated with detected neighbor cells 502 and the serving base station 102.

At 828, the mobile device can be switched from the serving cell of the serving base station to the selected neighbor cell. In one aspect, at a specified time (e.g. as specified by the serving base station 102), the mobile device 116 can be switched (e.g., handed over) from the current serving cell of the serving base station 102 to the selected neighbor cell 502, which can be the new serving cell serving the mobile device 116.

Referring to FIG. 9, depicted is a methodology 900 that can employ a one-to-one indicator to facilitate communications associated with a mobile device in a wireless communication system in accordance with an aspect of the disclosed subject matter. At 902, a first neighbor cell list can be received. In one aspect, a first serving base station 102 can transmit, and the mobile device 116 can receive, a first neighbor cell list to the mobile device (e.g., 116) that the first serving base station 102 is serving. The first neighbor cell list can include detected neighbor cells 502 of which the first serving base station 102 is aware.

At 904, a neighbor cell can be detected. In one aspect, the mobile device 116 can monitor signal strengths respectively associated with cells, such as the serving cell of the first serving base station 102 and/of any neighbor cells 502, to facilitate detection of neighbor cells 502 and determinations regarding selecting a desired (e.g., optimal) cell to which the mobile device 116 can be connected. In another aspect, the mobile device 116 can measure the signal strength of the detected neighbor cell(s) 502 and/or the serving cell of the first serving base station 102.

At 906, a one-to-one indicator associated with an offset parameter (e.g., Qoffset parameter) can be received. In one aspect, the mobile device 116 can receive a one-to-one indicator associated with an offset parameter related to the detected neighbor cell 502. The one-to-one indicator can be set to indicate mat the detected neighbor cell 502 has specified offset parameter values that can be respectively associated with base stations (e.g., detected neighbor cell 502 has specified offset parameter values that can be respectively associated with other cells associated with a base station(s) 102). For instance, the one-to-one indicator can be set to TRUE to indicate a particular offset parameter value of the neighbor cell 502 can have a one-to-one relationship depending in part on the base station to which the neighbor cell 502 is being compared or associated; and the one-to-one indicator can be set to FALSE to indicate the offset parameter value of the neighbor cell 502 can have a one-to-all relationship with base stations such that the same offset parameter, value can be used with regard to any of the base stations. As desired, the mobile device 116 will not read the offset parameter value when the one-to-one indicator is set to indicate a one-to-one relationship (e.g., one-to-one indicator set to TRUE) between the neighbor cell 502 and another base station (e.g., another cell of a base station 102).

For example, when a one-to-one relationship is indicated, the detected neighbor cell 502 can, have a first offset parameter value associated with a first base station and a disparate offset parameter value associated with a disparate base station. The appropriate offset parameter, value can be utilized to facilitate normalizing and/or adjusting a measured signal strength to facilitate more accurate measurement and comparisons of signal strengths of base stations.

At 908, a measurement report, can be transmitted, where the measurement report can include indicator information that can indicate that a one-to-one relationship exists with regard to the offset parameter and the offset parameter value has not been read. In one aspect, the mobile device 116 can transmit a measurement report that can include signal strength of a detected neighbor cell 502 and indicator information that can indicate that a one-to-one relationship exists with regard to the offset parameter associated with the detected neighbor cell 502 (e.g., one-to-one indicator set to TRUE) and the offset parameter value has not been read (e.g., offset indicator set to FALSE) by the mobile device 116.

At 910, the offset parameter value can be requested. In one aspect, the first serving base station 102 can request the one-to-one offset parameter value applicable to the first serving base, station 102 can be requested from the detected neighbor cell 502. At 912, the offset parameter value can be received. In an aspect, the detected neighbor cell 502 can retrieve the applicable offset parameter value from the data store 616 based in part on the first serving base station 102, and can transmit the applicable offset parameter value to the first serving base station 102, which can receive the applicable offset parameter value that can have a specified value based in part on the first serving base station 102 and the detected neighbor cell 502.

At 914, the first neighbor cell list can be updated. In one aspect, the first serving base station 102 can update the first neighbor cell list to include the detected neighbor cell 502 and information (e.g., identification information, attribute information, parameter information, etc.) associated therewith. At 916, the updated first neighbor cell list can be transmitted. In an aspect, the first serving base station 102 can transmit the updated first neighbor cell list to the mobile device 116.

At 918, the mobile device can be handed over to a disparate base, station. In one aspect, based at least in part on an evaluation of respective signal strengths and/or respective offset parameter values, the first serving base station 102 can determine that the mobile device 116 is to be handed over to a disparate base station (e.g., a neighbor cell 502 of a neighbor base station), which can be the disparate serving base station 102.

At 920, a disparate neighbor cell list can be received. In one aspect, a disparate serving base station 102 can transmit a disparate neighbor cell list to the mobile device (e.g., 116) that the disparate serving base, station 102 is serving. The disparate neighbor cell list can include detected neighbor cells 502 of which the disparate serving base station 102 is aware.

At 922, a neighbor cell can be detected (e.g., same neighbor base station detected at 904). In one aspect, the mobile device 116 can monitor signal strengths respectively associated with cells, such as the disparate serving cell of the disparate serving base station 102 and/or any neighbor cells 502, to facilitate detection of neighbor cells 502 and determinations regarding selecting a desired (e.g., optimal) cell to which the mobile device 116 can be connected. In another aspect, the mobile device 116 can measure the signal strength of the detected neighbor cell 502 and/or the disparate serving cell of the disparate serving base station 102.

At 924, a one-to-one indicator associated with an offset parameter (e.g., Qoffset parameter) can be received. In one aspect, the mobile device 116 can receive a one-to-one indicator associated with an offset parameter related to the detected neighbor cell 502. The one-to-one indicator can be set to indicate that the detected neighbor cell 502 has specified offset parameter values that can be respectively associated with base stations (e.g., 102). Again, as desired, the mobile device 116 will not read the offset parameter value when the one-to-one indicator is set to indicate a one-to-one relationship (e.g., one-to-one indicator set to TRUE) between the neighbor cell 502 and a particular base station.

At 926, a measurement report can be transmitted, where the measurement report can include indicator information that can indicate that a one-to-one relationship exists with regard to the offset parameter and the offset parameter value has not been read. In one aspect, the mobile device 116 can transmit a measurement report that can include signal strength of a detected neighbor cell 502 and indicator information that can indicate that a one-to-one relationship exists with regard to the offset parameter associated with the detected neighbor cell 502 (e.g., one-to-one indicator set to TRUE) and the offset parameter value has not been read (e.g., offset indicator set to FALSE) by the mobile device 116.

At 928, the offset parameter value can be requested. In one aspect, the disparate serving base station 102 can request the one-to-one offset parameter value applicable to the disparate serving base station 102 can be requested from the detected neighbor cell 502. At 930, a disparate offset parameter value can be received. In an aspect, the detected neighbor cell 502 can retrieve the applicable offset parameter value (e.g., disparate offset parameter value) from the data store 616 based in part on the disparate serving base station 102, and can transmit the applicable offset parameter value to the disparate serving base station 102, which can receive the applicable offset parameter value that can have a specified value based in part on the disparate serving base station 102 and the detected neighbor cell 502.

At 932, the disparate neighbor cell list can be updated. In one aspect, the disparate serving base station 502 can update the disparate neighbor cell list to include the detected neighbor cell 502 and information (e.g., identification information, attribute information, parameter information, disparate offset parameter, etc.) associated therewith. At 934, the updated disparate neighbor cell list can be transmitted. In an aspect, the disparate serving base station 102 can transmit the updated disparate neighbor cell list to the mobile device 116.

It will be appreciated that, in accordance with one or more aspects described herein, inferences can be made relating to parameter values and/or indicator information respectively related to parameter values associated with a neighbor cell 502 and communication associated with the mobile device(s) 116 in the network. As used herein, the term to "infer" or "inference" refers generally to the process of reasoning about or inferring states of the system, environment, and/or user from a set of observations as captured via events and/pr data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, one or more methods presented above can include making an inference(s) pertaining to whether a parameter value associated with a detected neighbor cell 502 has been read by a mobile device 116; whether a signal strength value of a detected neighbor cell 502 received by a serving base station 102 is a combined value of the measured signal strength and die offset parameter value, or only the measured signal strength, of a detected neighbor cell 502; and/or whether the mobile device 116 is to be handed over from a serving cell of a serving base station 102 to a neighbor cell 502. It will be appreciated that the foregoing examples are illustrative in nature and are not intended to limit the number of inferences that can be made or the manner in which such inferences are made in conjunction with the various embodiments and/or methods described herein.

Figure 10:
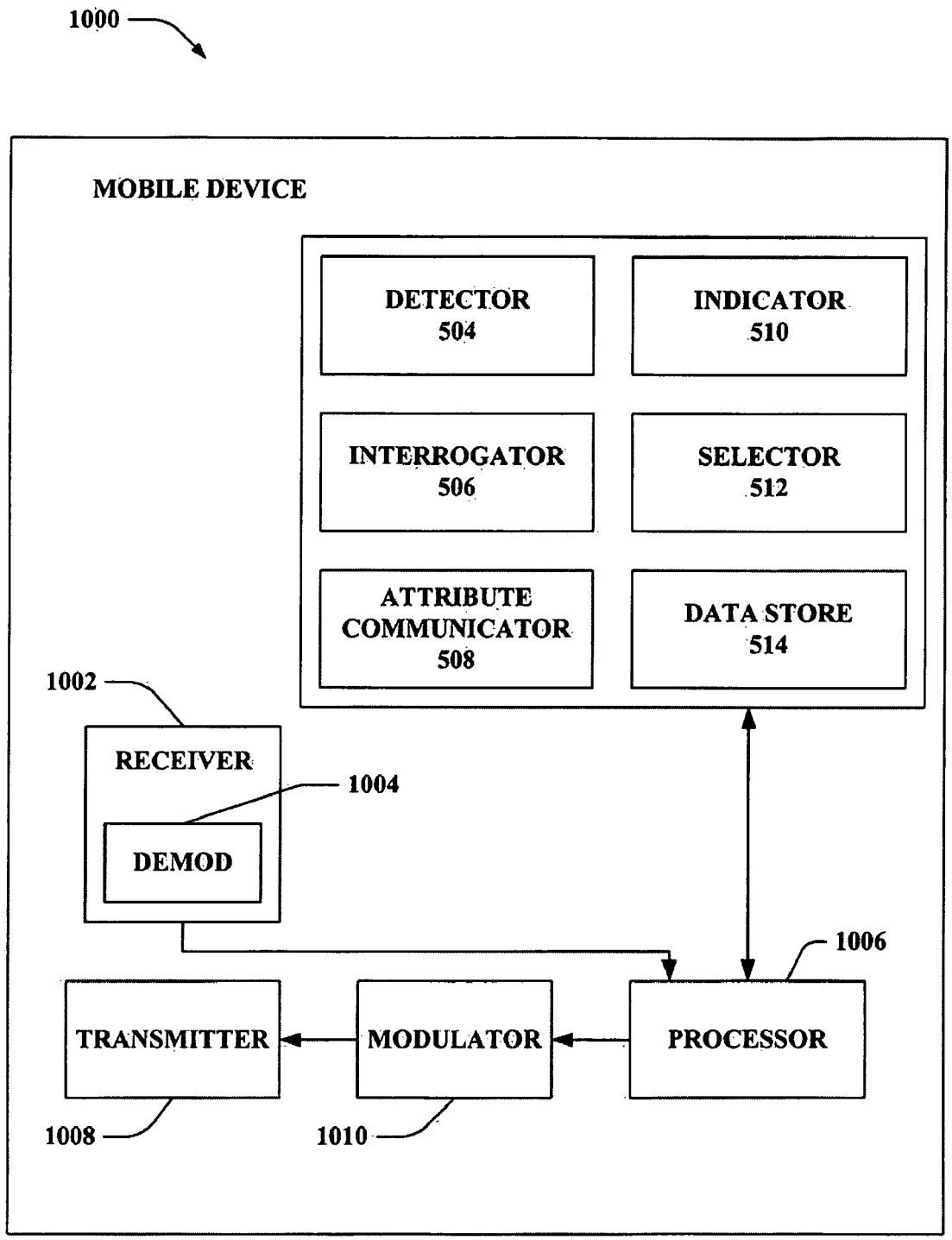
FIG. 10 is an illustration of an example mobile device that can facilitate communications associated with a mobile device in a wireless communication system in accordance with an aspect of the disclosed subject matter.

FIG. 10 is an illustration of a mobile device 1000 that can facilitate communications associated with a mobile device in a wireless communication system in accordance with an aspect of the disclosed subject matter. It is to be appreciated that the mobile device 1000 can be the same or similar as, and/or can comprise the same or similar functionality as, mobile device 116, as more described herein, for example, with regard to system 100, diagram 200, diagram 300, diagram 400, system 500, system 600, methodology 700, methodology 800, and methodology 900.

Mobile device 1000 can comprise a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000. Mobile device 1000 can also comprise a modulator 1010 that can work in conjunction with the transmitter 1008 to facilitate transmitting signals (e.g., data) to, for instance, a base station 102, another mobile device, etc.

The processor 1006 can be connected to a detector 504 that can facilitate detecting a cell(s) (e.g., neighbor cell(s) 502) located in the vicinity of the mobile device 1000. The processor 1006 also can be connected to an interrogator 506 that can facilitate interrogating, reading, and/or requesting information, such as signal strength, offset values, CSG bit, identification information, neighbor cell lists, and/or other information from base stations and/or cells (e.g., serving base station 102, neighbor cell(s) 502). The processor 1006 can be connected to an attribute communicator 508 that can facilitate transmitting information, such as attribute and parameter values (e.g., signal strength, Qoffset), indicator information (e.g., offset indicator, one-to-one indicator, CSG bit indicator), identification information, and/or other information related to a cell(s) (e.g., neighbor cell(s) 502) to the serving base station 102. Processor 1006 can be connected to an indicator 510 mat can facilitate providing indicator information, such as an offset indicator, CSG bit indicator, and/or one-to-one indicator, related to various parameters associated with a neighbor cell(s) 502 to the serving base station 102. Processor 1006 also can be connected with a selector 512 that can facilitate selecting a desired cell, for example, when the serving base station 102 sends a message indicating that the mobile device 116 is to be handed over to a neighbor cell 502.

Mobile device 1000 can additionally comprise data store 514 that can be operatively coupled to processor 1006 and can store data to be transmitted, received data, information related to base stations, and/or cells (e.g., serving base station 102, neighbor base station(s) 502), information related to the mobile device 1000, and/or any other suitable information that can facilitate communication of data associated with the mobile device 1000. Data store 514 can additionally store protocols and/or algorithms associated with detecting cells, requesting or reading information from cells, providing indicator information, selecting a cell with which to communicate, and/or other functions related to the mobile device 1000.

It is to be appreciated and understood that the detector 504, interrogator 506, attribute communicator 508, indicator 510, selector 512, and data store 514 each can be the same or similar as, or can comprise the same or similar functionality as, respective components such as more fully described herein, for example, with regard to system 500. It is to be further appreciated and understood that the detector 504, interrogator 506, attribute communicator 508, indicator 510, selector 512, and data store 514 each can be a stand-alone unit (as depicted), can be included within the processor 1006, can be incorporated within another component, and/or virtually any suitable combination thereof, as desired.

Figure 11:
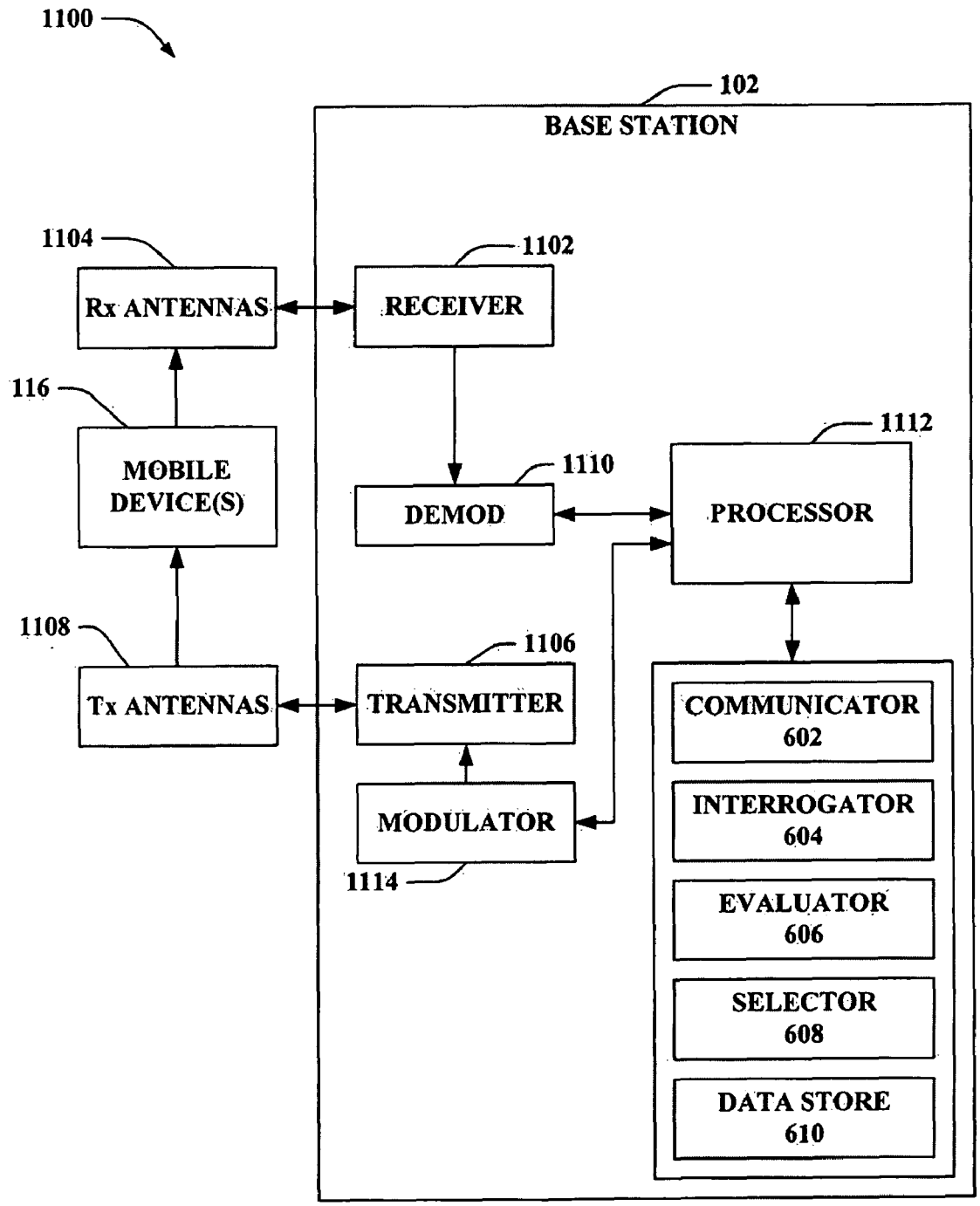
FIG. 11 is a depiction of an example system that can facilitate communications associated with a mobile device in a wireless communication system in accordance with an aspect of the disclosed subject matter.

FIG. 11 is an illustration of a system 1100 that can facilitate communications associated with a mobile device in a wireless communication system in accordance with an aspect of the disclosed subject matter. System 1100 can comprise a base station 102 (e.g., access point, . . . ). The base station 102 can include a receiver 1102 that can receive signal(s) from one or more mobile devices 116 through a plurality of receive antennas 1104, and a transmitter 1106 that can transmit signals (e.g., data) to the one or more mobile devices 116 through a transmit antenna 1108. Receiver 1102 can receive information from receive antennas 1104 and can be operatively associated with a demodulator 1110 that can demodulate received information. Demodulated symbols can be analyzed by a processor 1112 that can be a processor dedicated to analyzing information received by receiver 1102 and/or generating information for transmission by a transmitter 1106, a processor that controls one or more components of base station 102, and/or a processor that both analyzes information received by receiver 1102, generates information for transmission by transmitter 1106, and controls one or more components of base station 102. The base station 102 can also comprise a modulator 1114 that can work in conjunction with the transmitter 1106 to facilitate transmitting signals (e.g., data) to, for instance a mobile device 116, another device, etc.

Processor 1112 can be connected with a communicator 602 that can facilitate transmitting information from the base station 102 to a mobile device 116, another base station(s), a cell (e.g., neighbor cell 502), and/or another device(s) associated with the base station 102 in a wireless communication environment. Processor 1112 also can be connected to an interrogator 604 that can facilitate interrogating, reading, and/or requesting information (e.g., Qoffset, CSG bit, etc.) from other base stations, cells (e.g., neighbor cells 502), and/or the mobile device 116. For example, the interrogator 604 can request Qoffset information from a neighbor cell 502 when a mobile device 116 has provided an offset indicator that is set to indicate that the mobile device 116 did not read the offset value of the neighbor cell 502 or when the base station 102 desires to verify an offset value of a neighbor cell 502 that is provided by a mobile device 116.

Processor 1112 can be connected with an evaluator 606 that can facilitate evaluating information related to a mobile device 116, the base station 102, other base stations, and/or cells (e.g., neighbor cells 502) to facilitate selecting a cell with which a mobile device 116 can communicate to facilitate communication by the mobile device 116 in the network. Processor 1112 also can be connected to a selector 608 that can utilized the evaluation results to facilitate selecting a cell with which a mobile device 116 can communicate, as the selector 608 can facilitate determining and selecting a cell (e.g., remain connected to the serving cell of the serving base station 102; handed or switched over to a neighbor cell 502) with which the mobile device 116 is to communicate in the network.

Processor 1112 can be coupled to a data store 610 that can store information related to data to be transmitted, received data, information related to base stations (e.g., serving base station 102), information related to a mobile device 116, information related to cells (e.g., neighbor cell 502), and any other suitable information that can facilitate communication of information, (e.g., voice, data) associated with a mobile device 116. Data store 610 can additionally store protocols and/or algorithms associated with and facilitating communicating with a mobile device 116, another base, station, cells, or another device; interrogating a base station 102, mobile device 116, or cell; evaluating information associated with a mobile device 116; the base station 102, another base station 102, or cell (e.g., 502); and/or selecting a cell with which a mobile device 116 can communicate in the network.

It is to be appreciated and understood that the communicator 602, interrogator 604, evaluator 606, selector 608, and data store 610 each can be the same or similar as, and/or can comprise the same or similar functionality as, respective components, such as more fully described herein, for example, with regard to system 600. It is to be further appreciated and understood that communicator 602, interrogator 604, evaluator 606, selector 608, and data store 610, each can be a stand-alone unit (as depicted), can be included within the processor 1112, can be incorporated within another component, and/or virtually any suitable combination thereof, as desired.

Figure 12:
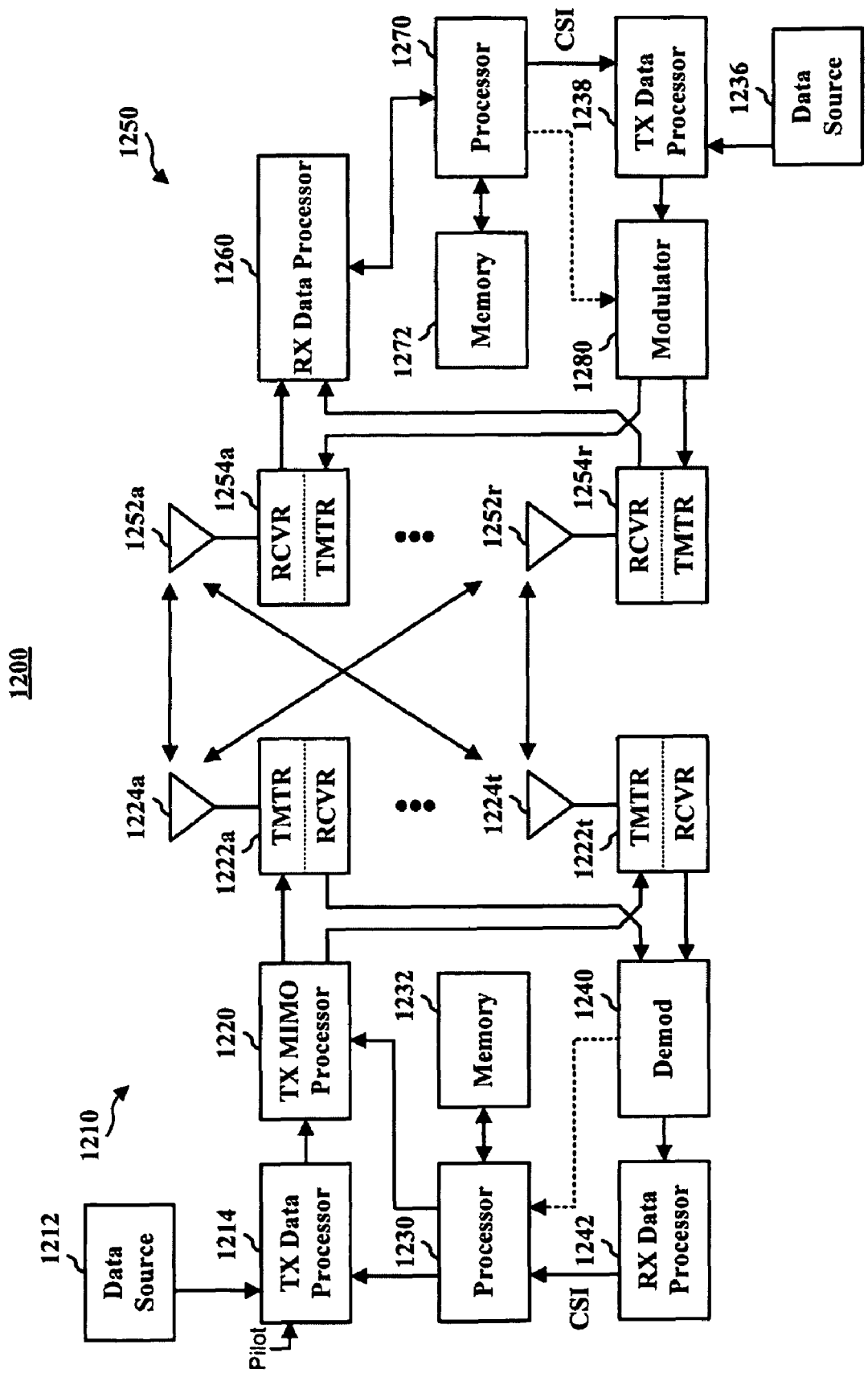
FIG. 12 is an illustration of ah example wireless network system that can be employed in conjunction with the various systems and methods described herein.

FIG. 12 shows an example wireless communication system 1200 in accordance with an aspect of the disclosed subject matter. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1, 5-6, 10-11) and/or methods (FIGS. 7-9) described herein to facilitate wireless communication there between. It is to be appreciated that base station 1210, and mobile device 1250 each can be respectively the same or similar as, and/or can comprise respectively the same or similar functionality as, respective components as more fully described herein, such as, for example, with regard to system 100, diagram 200, diagram 300, diagram 400, system 500, system 600, system 1000, and/or system 1100.

At base station 1210, traffic data for a number of data streams is provided from a data source 1212 to a transmit (TX) data processor 1214. According, to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division, multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides modulation symbol streams to $N_T$ transmitters (TMTR) 1222a through 1222. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to use (discussed below). Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message and can determine which precoding matrix to use for determining the beamforming weights.

Processors 1230 and 1270 can direct (e.g., control, coordinate, manage, etc) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect. Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory, sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
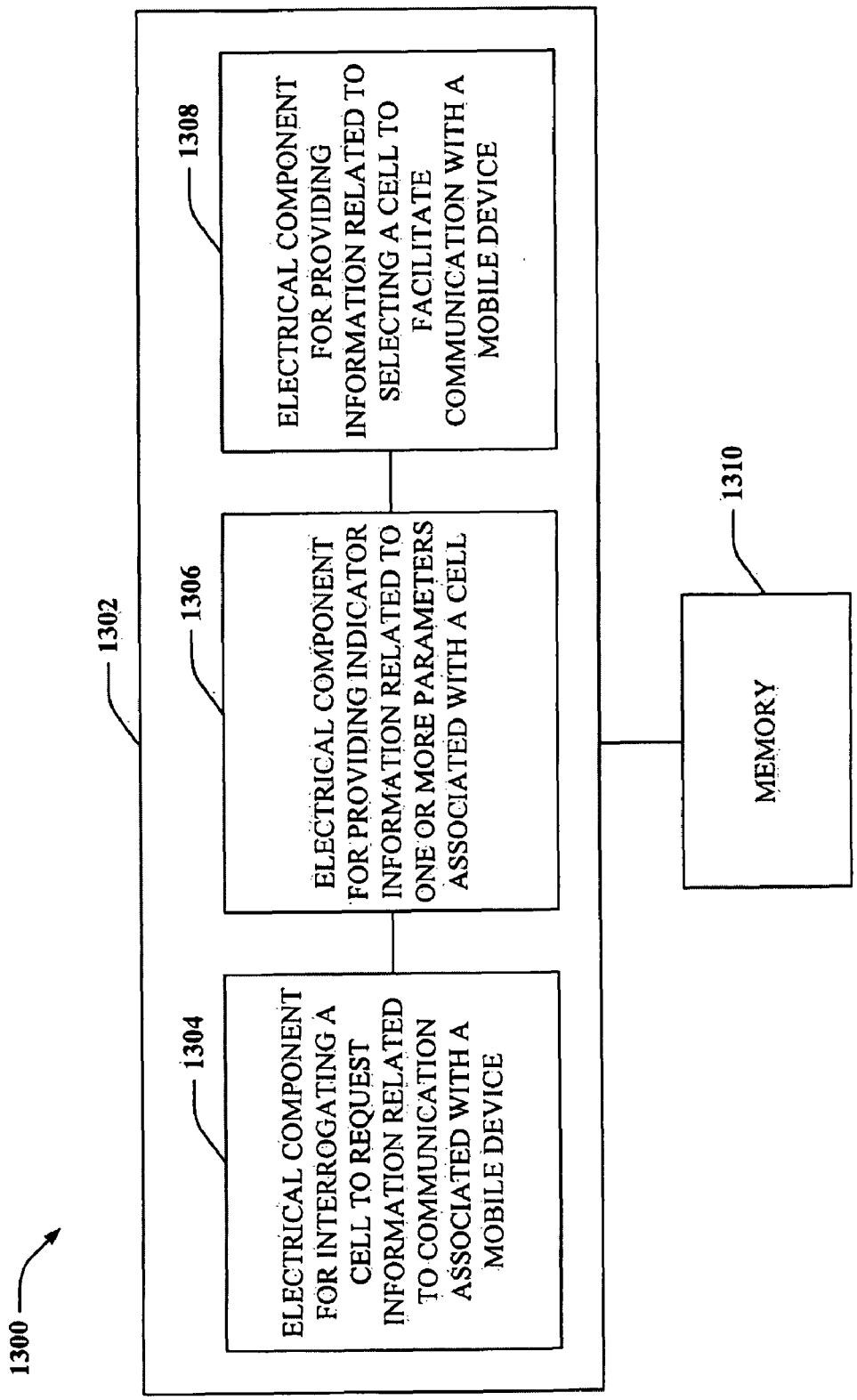
FIG. 13 is a depiction of an example system that can facilitate communication associated with a mobile device in a wireless communication environment.

With reference to FIG. 13, illustrated is a system 1300 that can facilitate communication associated with a mobile device in a wireless communication environment. For example, system 1300 can reside at least partially within a mobile device (e.g., 116). It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction.

For instance, logical grouping 1302 can include an electrical component for interrogating a cell (e.g., neighbor cell 502) to request information related to communication associated with a mobile device (e.g., 116) 1304. For instance, the electrical component for interrogating a cell can request and/or measure information associated with a detected neighbor cell 502 detected by the mobile device 116 and/or a serving base station 102, where the information can include signal strength, parameter values, attribute values, identification information, indicator information, and/or other information associated with the detected neighbor cell 502 or serving base station 102. In one aspect, the electrical component for interrogating a cell (e.g., detected neighbor cell 502) optionally can read one of more parameters, such as an offset value (e.g., Qoffset) or a GSG bit, associated with the cell.

Further, logical grouping 1302 can comprise an electrical component for providing indicator information related to one or more parameters associated with a cell (e.g., neighbor cell(s) 502) 1306. In one aspect, the electrical component for providing indicator information can provide indicator information that can indicate whether the mobile device 116 read a parameter value(s) and/or adjusted a measured attribute value associated with a cell (e.g., detected neighbor cell 502) based in part on the read parameter value(s).

Logical grouping 1302 also can include, an electrical component for providing information related to selecting a cell to facilitate communication with the mobile device (e.g., 116) 1308. For instance, the electrical component for providing information related to selecting a cell can provide identification information, attribute information, parameter information, indicator information, and/or other information that can be evaluated to facilitate selecting a desired (e.g., optimal) cell to which the mobile device 116 is to be connected (e.g., cell that is to be the serving cell of the serving base station 102 for the mobile device 116) to facilitate communication by the mobile device 116 in the network. Additionally, system 1300 can include a memory 1310 that can retain instructions for executing functions associated with electrical components 1304, 1306, and 1308. While shown as being external to memory 1310, it is to be understood that one or more of electrical components, 1304, 1306, and 1308 can exist within memory 1310.

Figure 14:
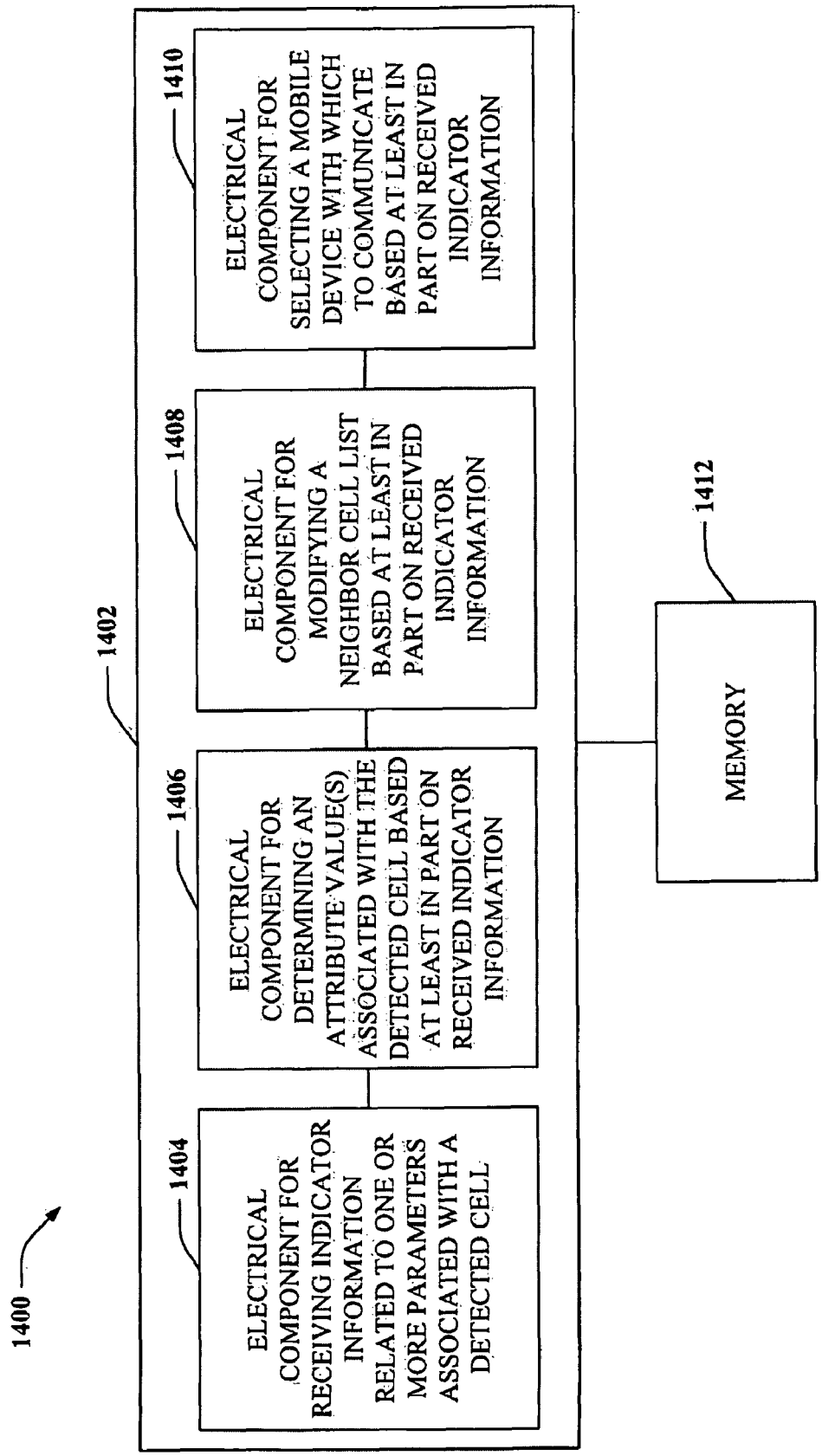
FIG. 14 is an illustration of another example system that can facilitate communication associated with a mobile device in a wireless communication environment.

Turning to FIG. 14, illustrated is a system 1400 that can facilitate communication associated with a mobile device in a wireless communication environment. For example, system 1400 can reside at least partially within a base station 102 (e.g., serving base station 102) that, can be associated (e.g., wirelessly connected) with a mobile device (e.g., 116). It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction.

In one aspect, logical grouping 1402 can include an electrical component for receiving indicator information related to one or more parameters associated with a detected cell(s) (e.g., detected neighbor cell 502) 1404. Further, logical grouping 1402 can comprise an electrical component for determining an attribute value(s) associated with a detected, cell(s) (e.g., detected neighbor cell(s) 502) based at least in part on received indicator information 1406. Logical grouping 1402 also can include an electrical component for modifying a neighbor cell list based at least in part on the received indicator information 1408. In one aspect, the electrical component for modifying a neighbor cell list optionally can modify a neighbor cell list of a serving base station 102 to include information related to a detected neighbor cell 502 based at least in part on received indicator information (e.g., Qoffset, CSG bit, etc.). The electrical component for modifying a neighbor, cell list can provide (e.g., broadcast) the updated neighbor cell list to mobile devices 116 associated with the serving base station 102. Logical grouping 1402 also can include an electrical component for selecting a cell with which a mobile device (e.g., 116) can be connected and communicate based at least in part on received indicator information 1410. Additionally, system 1400 can include a memory 1412 that retains instructions for executing functions associated with electrical components 1404, 1406, 1408, and 1410. While shown as being external to memory 1412, if is to be understood that one or more of electrical components 1404, 1406, 1408, and 1410 can exist within memory 1412.

What has been described above includes examples of one or more embodiments. It is, of course, not possible to describe every conceivable combination of components or methodologies for purposes of describing the aforementioned embodiments, but one of ordinary skill in the art may recognize that many further, combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication associated with a mobile device, comprising:
optionally reading at least one parameter value associated with at least one attribute related to a detected neighbor cell; and
transmitting at least one indicator associated with the at least one parameter value, wherein the at least one indicator indicates whether the at least one parameter value has been read to facilitate communication associated with the mobile device based at least in part on the at least one indicator.

2. The method of claim 1, the at least one parameter value relates to at least one of an offset value related to the at least one attribute comprising signal strength of the detected neighbor cell, a closed subscriber group (CSG) bit, or a one-to-one relationship between the detected neighbor cell and a serving base station with regard to an offset value related to the at least one attribute.

3. The method of claim 1, further comprising:
detecting the neighbor cell;
measuring signal strength of the detected neighbor cell;
applying the at least one parameter value, comprising an offset parameter value associated with the detected neighbor cell, to the measured signal strength to obtain a refined signal strength, if the offset parameter value has been read; and
transmitting at least one of the measured signal strength or the refined signal strength and the at least one indicator, comprising an offset indicator, in a measurement report to a serving base station, the offset indicator indicates the offset parameter value was read if the mobile device has read the offset parameter value or the offset parameter value was not read if the mobile device did not read the offset parameter value.

4. The method of claim 3, further comprising:
receiving an updated neighbor cell list that includes information related to the detected neighbor cell.

5. The method of claim 1, further comprising:
receiving a one-to-one indicator from the detected neighbor cell, the one-to-one indicator indicates that the detected neighbor cell employs disparate offset parameter values respectively associated with disparate base stations, the detected neighbor cell employs a first offset parameter value with respect to a first serving base station;
transmitting the at least one indicator, comprising the one-to-one indicator and an offset indicator, to a serving base station, the offset indicator indicates that the mobile device did not read the offset parameter value associated with the detected neighbor cell; and
receiving an updated neighbor cell list from the first serving base station that includes information related to the detected neighbor cell, the information comprising the first offset parameter value.

6. The method of claim 5, further comprising:
switching the mobile device to a disparate serving base station;
receiving another one-to-one indicator from the detected neighbor cell, the detected neighbor cell employs a disparate offset parameter value with respect to the disparate serving base station;
transmitting the other one-to-one indicator and an offset indicator, to a serving base station, the offset indicator indicates that the mobile device did not read the offset parameter value associated with the detected neighbor cell; and
receiving a disparate updated neighbor cell list from the disparate serving base station that includes information related to the detected neighbor cell, the information comprising the disparate offset parameter value.

7. The method of claim 1, further comprising:
receiving a message that indicates the mobile device is to switch from a serving cell of a serving base station to a selected neighbor cell, the selected neighbor cell selected based at least in part on the at least one indicator; and
switching the mobile device from the serving cell of the serving base station to the selected neighbor cell.

8. The method of claim 1, further comprising:
receiving information indicating the detected neighbor cell is associated with a closed subscriber group (CSG);
transmitting the at least one indicator comprising a CSG bit indicator that indicates the detected neighbor cell is associated with a CSG; and
receiving a message relating to a selected cell for communication associated with the mobile device, the selected cell is selected based at least in part on the CSG indicator.

9. A wireless communications apparatus, comprising:
a memory that retains instructions related to transmission of at least one indicator associated with optional read of at least one parameter value related to at least one attribute associated with a detected neighbor cell to facilitate communication associated with a mobile device based at least in part on the at least one indicator, wherein the at least one indicator indicates whether the at least one parameter value has been read; and
a processor, coupled to the memory, configured to execute the instructions retained in the memory.

10. The wireless communications apparatus of claim 9, wherein the at least one parameter value relates to at least one of an offset value related to the at least one attribute comprising signal strength of the detected neighbor cell, a closed subscriber group (CSG) bit, or a one-to-one offset value, related to the at least one attribute, between the detected neighbor cell and a serving base station.

11. The wireless communications apparatus of claim 9, wherein the memory further retains instructions related to optional read of the at least one parameter value related to the at least one attribute associated with the detected neighbor cell.

12. The wireless communications apparatus of claim 9, wherein the memory further retains instructions related to selection of a cell to communicatively connect with a mobile device based at least in part on the at least one indicator.

13. The wireless communications apparatus of claim 9, wherein the memory retains instructions related to setting the at least one indicator based at least in part on information received from the detected neighbor cell.

14. A wireless communications apparatus that facilitates communication associated with a mobile device, comprising:
means for interrogating a detected neighbor cell to request information related to communication associated with the mobile device to facilitate optionally reading at least one parameter value associated with at least one attribute related to the detected neighbor cell; and
means for transmitting at least one indicator associated with the at least one parameter value associated with the detected neighbor cell, wherein the at least one indicator indicates whether the at least one parameter value has been read to facilitate communication associated with the mobile device based at least in part on the at least one indicator.

15. The wireless communications apparatus of claim 14, the at least one indicator relates to at least one of an offset value related to the at least one attribute comprising signal strength of the detected neighbor cell, a closed subscriber group (CSG) bit, or a one-to-one relationship between the detected neighbor cell and a serving base station with regard to an offset value related to the at least one attribute.

16. The wireless communications apparatus of claim 14, further comprising:
  means for detecting the neighbor cell;
  means for measuring signal strength of the detected neighbor cell;
  means for determining a refined signal strength based at least in part on the measured signal strength and the at least one parameter value, comprising an offset parameter value associated with the detected neighbor cell, if the offset parameter value has been read; and
  means for transmitting at least one of the measured signal strength or the refined signal strength and the at least one indicator, comprising an offset indicator, in a measurement report to a serving base station, the offset indicator indicates the offset parameter value was read if the mobile device has read the offset parameter value or the offset parameter value was not read if the mobile device did not read the offset parameter value.

17. The wireless communications apparatus of claim 14, further comprising:
  means for receiving a one-to-one indicator from the detected neighbor cell, the one-to-one indicator indicates that the detected neighbor cell employs disparate offset parameter values respectively associated with disparate base stations;
  means for transmitting the at least one indicator, comprising the one-to-one indicator and an offset indicator, to a serving base station, the offset indicator indicates that the mobile device did not read the offset parameter value associated with the detected neighbor cell; and
  means for receiving an updated neighbor cell list from a first serving base station that includes information related to the detected neighbor cell, the information comprising a first offset parameter value determined based at least in part on the detected neighbor cell and the first serving base station.

18. A computer program product, comprising:
  a computer-readable medium comprising code for:
  optionally reading at least one parameter value associated with at least one attribute related to a detected neighbor cell; and
  transmitting at least one indicator associated with the at least one parameter value, wherein the at least one indicator indicates whether the at least one parameter value has been read to facilitate communication associated with the mobile device based at least in part on the at least one indicator.

19. The computer program product of claim 18, further comprising:
  a computer-readable medium comprising code for:
  detecting the neighbor cell;
  measuring signal strength associated with the detected neighbor cell;
  determining a refined signal strength based at least in part on applying the at least one parameter value, comprising an offset parameter value associated with the detected neighbor cell, to the measured signal strength, if the offset parameter value has been read; and
  transmitting at least one of the measured signal strength or the refined signal strength and the at least one indicator, comprising an offset indicator, in a measurement report to a serving base station, the offset indicator indicates the offset parameter value has been read if the mobile device has read the offset parameter value or the offset parameter value has not been read if the mobile device did not read the offset parameter value.

20. The computer program product of claim 18, further comprising:
  a computer-readable medium comprising code for:
  receiving a one-to-one indicator from the detected neighbor cell, the one-to-one indicator indicates that the detected neighbor cell employs different offset parameter values respectively associated with different base stations, the detected neighbor cell employs a first offset parameter value with respect to a first serving base station;
  transmitting the at least one indicator, comprising the one-to-one indicator and an offset indicator, to a serving base station, the offset indicator indicates that the mobile device did not read the offset parameter value associated with the detected neighbor cell; and
  receiving an updated neighbor cell list from the first serving base station that includes information related to the detected neighbor cell, the information comprising the first offset parameter value.

21. The computer program product of claim 18, further comprising:
  a computer-readable medium comprising code for:
  receiving information indicating the detected neighbor cell is associated with a closed subscriber group (CSG);
  transmitting the at least one indicator comprising a CSG bit indicator that indicates the detected neighbor cell is associated with a CSG; and
  receiving a message relating to a selected cell for communication associated with the mobile device, the selected cell is selected based at least in part on the CSG indicator.

22. In a wireless communications system, an apparatus comprising:
  a processor configured to:
  optionally read at least one parameter value associated with at least one attribute related to a detected neighbor cell; and
  transmit at least one indicator associated with the at least one parameter value, wherein the at least one indicator indicates whether the at least one parameter value has been read to facilitate communication associated with the mobile device based at least in part on the at least one indicator.

23. The apparatus of claim 22, the processor further configured to:
  detect the neighbor cell;
  measure signal strength of the detected neighbor cell;
  apply the at least one parameter value, comprising an offset parameter value associated with the detected neighbor cell, to the measured signal strength to obtain a refined signal strength, if the offset parameter value has been read; and
  transmit at least one of the measured signal strength or the refined signal strength and the at least one indicator, comprising an offset indicator, in a measurement report to a serving base station, the offset indicator indicates the offset parameter value was read if the mobile device has read the offset parameter value or the offset parameter value was not read if the mobile device did not read the offset parameter value.

* * * * *